United States Patent [19]
Budhraja et al.

[11] Patent Number: 5,935,209
[45] Date of Patent: Aug. 10, 1999

[54] SYSTEM AND METHOD FOR MANAGING FIBER-TO-THE-CURB NETWORK ELEMENTS

[75] Inventors: Virenda Kumar Budhraja, Petaluma; James Jisheng Song, Rohnert Park; Hung Minh Dinh, Santa Rosa; Jose Roberto Santiano Fernandez, Rohnert Park; Caroline Stephanie Gan Lazovick, Santa Rosa, all of Calif.

[73] Assignee: Next Level Communications, Rohnert Park, Calif.

[21] Appl. No.: 08/711,027

[22] Filed: Sep. 9, 1996

[51] Int. Cl.$^6$ .................................................. G06F 17/00
[52] U.S. Cl. ............................................................ 709/223
[58] Field of Search ........................ 395/200.53, 200.54, 395/200.55, 200.56

[56] References Cited

U.S. PATENT DOCUMENTS

| | | | |
|---|---|---|---|
| 5,226,120 | 7/1993 | Brown et al. | 395/200 |
| 5,361,250 | 11/1994 | Nguyen et al. | 370/16.1 |
| 5,491,796 | 2/1996 | Wanderer et al. | 395/200.09 |
| 5,579,384 | 11/1996 | Seymour | 379/243 |
| 5,729,688 | 3/1998 | Kim et al. | 395/200.56 |

OTHER PUBLICATIONS

Witt, "Re: Commercial SNMP Agent Development Software Recommendati," <1996Feb9.193553.11648@kentrox.com>, pp. 1–2, Feb. 9, 1996.

Case et al., "A Simple Network Management Protocol," Network Working Group, RFC: 1067, all pages, Aug. 1988.

Introduction to SNMP Research International, 1995, http://www.snmp.com/basicintro.html.

SNMP Research, © 1995, http://www.snmp.com/products.html.

SNMP Research International's DR–Web Among "Nick's Pick's" for Network Management, Knoxville, Tenn.–Sep. 26, 1996,© 1996, http://www.snmp.com/pressrel/atlantanick,html.

DR–Web: Extensible Agent, © 1996, http://www.snmp.com/drweb.html.

The Emanate Run–time Extensible Agent System, © 1995, http://www.snmp.com/emanateintro.html.

FAQ–Frequently Asked Questions –FAQ Simple Network Management Protocol, Sep. 8, 1996, Version 2.18, © 1995, http://www.snmp.com/FAQs/snmp-faq-part1.txt.

FAQ–Frequently Asked Questions –FAQ Simple Network Management Protocol, Sep. 8, 1996, Version 2.18, © 1995, http://www.snmp.com/FAQs/snmp-faq-part2.txt.

*Primary Examiner*—Ellis B. Ramirez
*Attorney, Agent, or Firm*—Wilson, Sonsini, Goodrich & Rosati

[57] ABSTRACT

One embodiment of the invention includes a method for managing a plurality of network elements in a Fiber-to-the-Curb (FTTC) telecommunications system. The FTTC system includes a computer system. The computer system is coupled in communications with the plurality of network elements. The method comprises the following steps. Display a plurality of choices on the computer system. The plurality of choices corresponds to a provisioning equipment function, a provisioning telephony services functions and a provisioning broadband services function. Receive a selection identifying a choice and identifying one or more selected network elements. Provision the one or more selected network elements.

29 Claims, 16 Drawing Sheets

SYSTEM AND METHOD FOR MANAGING FIBER-TO-THE-CURB NETWORK ELEMENTS

I. BACKGROUND OF THE INVENTION

A. Field of the Invention

The invention generally relates to a system for managing telecommunications network systems. In particular, one embodiment of the invention relates to a system for provisioning elements in a Fiber-to the curb telecommunications system.

B. Background Art

Fiber-to-the-curb (FTTC) telecommunications systems provide both traditional telecommunications services such as Plain Old Telephony service (POTs) as well as advanced Switched Digital Services (SDS) such as video and high speed data access. Because of the range of services which can be supported, it is likely that FTTC systems will be widely deployed by telephone companies as they install new lines and upgrade their networks.

Telephone companies which can use FTTC telecommunications systems typically provide services to hundreds of thousands and even millions of subscribers. The telecommunications network has traditionally required manual intervention to provision services and equipment; this manual intervention is usually in the form of a craftsperson who will re-wire and configure equipment as necessary to provide new services to subscribers requesting those services, or to restore services after failure of a network element.

Even where manual intervention is not necessary, the existing computerized systems for managing telecommunications system are comprised of a number of Operation and Support Systems (OSS) and Business Support Systems (BSS) which allow the telephone company to turn service on to new subscribers, process alarms from faulty equipment in a semi-automatic manner, and in general to operate their network. In the present telecommunications network there are many types of OSS and BSS, and there are at present no systems which provide the ability to provision equipment and services for voice, video and data. Another drawback of the existing OSS is that they are not scaleable and therefore cannot be run on a workstation or PC to control a few thousand homes, but are run on a mainframe computer and will typically control tens of thousands of subscribers. Another drawback of the existing OSS is that for those elements that can be provisioned, the OSS provisioning is not intuitive or simple. Often a customer services representative will have to use cryptic commands to provision some element.

A further drawback of existing systems is that they do not offer flow-through provisioning for all of the services which are now available in FTTC platforms. Flow-through provisioning occurs when a customer service representative processes a customer request or complaint, and all of the subsequent steps in equipment and service provisioning are automatically executed. Some flow-through provisioning exists for telephony services, but the OSS does not begin to address the wide range of voice, video and data services which will be available in the FTTC platform.

FTTC systems offer such a wide range of services, and present an overwhelming set of choices to the craftsperson. For this reason there exists the need for a method and apparatus for element management in FTTC systems.

II. SUMMARY OF THE INVENTION

One embodiment of the invention includes a method for managing a plurality of network elements in a Fiber-to-the-Curb (FTTC) telecommunications system. The FTTC system includes a computer system. The computer system is coupled in communications with the plurality of network elements. The method comprises the following steps. Display a plurality of choices on the computer system. The plurality of choices corresponds to a provisioning equipment function, a provisioning telephony services functions and a provisioning broadband services function. Receive a selection identifying a choice and identifying one or more selected network elements. Provision the one or more selected network elements.

In one embodiment, the computer displays a graphical representation of at least one network element and the information relating to the state of that network element. The graphical display provides an intuitive interface for the operator and makes the provisioning of the network elements simpler for the operator. In another embodiment, the graphical representation is a photorealistic representation of the network element.

In one embodiment, the computer displays the status of any dynamic cross-connections established within the FTTC system.

In one embodiment, the operator connects a computer system with a browser to a network, such as the Internet. The network elements, through an element management system, provide Hypertext Markup Language (HTML) formatted information to a browser.

III. BRIEF DESCRIPTION OF THE DRAWINGS

The figures illustrate the invention by way of example, and not limitation. Like references indicate similar elements.

IV. DESCRIPTION OF THE EMBODIMENTS

A. Fiber-to-the-Curb (FTTC) Systems

1. FTTC System Overview

Figure 1:
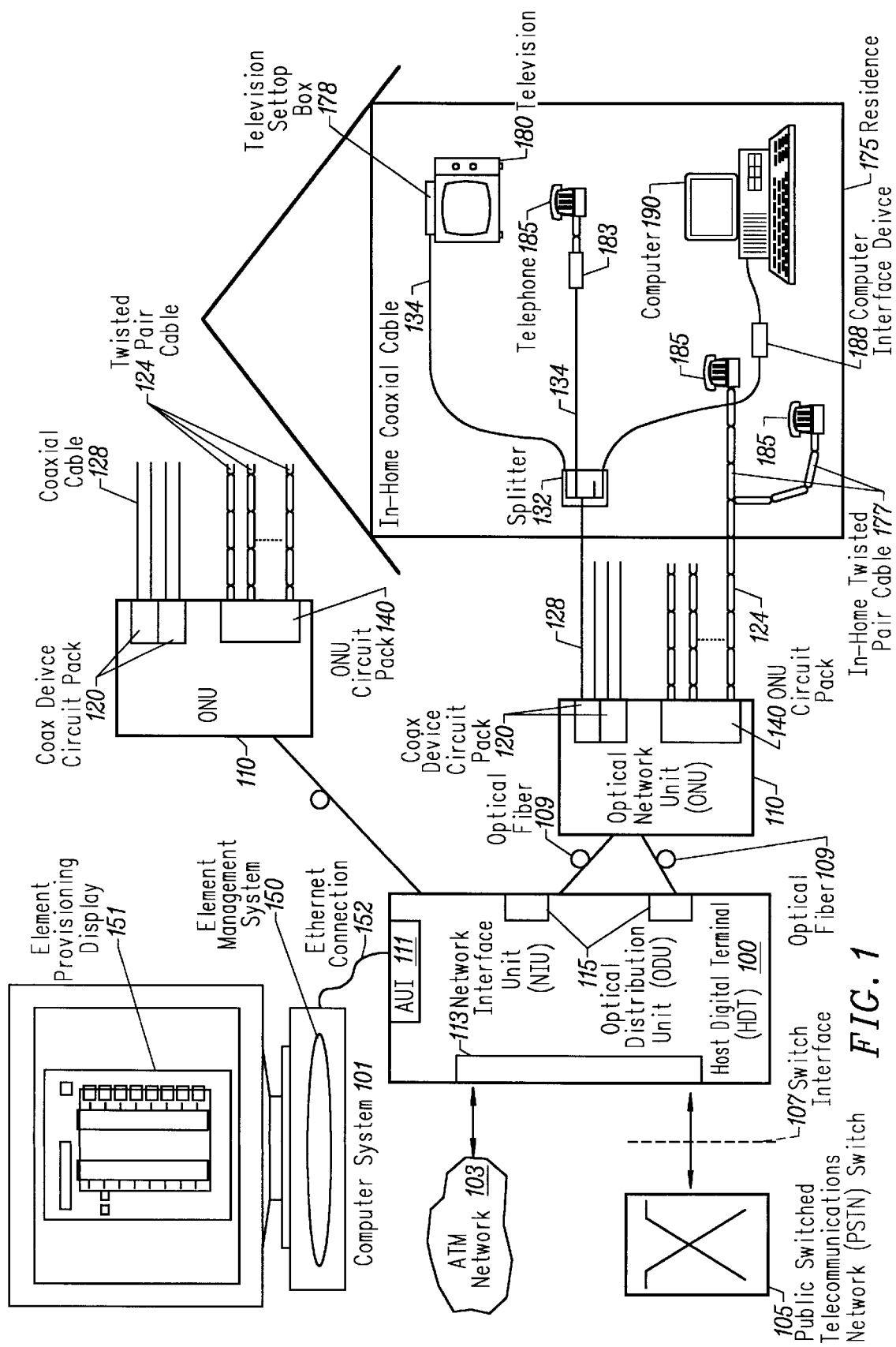
FIG. 1 illustrates a Fiber-to-the-Curb (FTTC) system including an element management system (EMS).

FIG. 1 illustrates a FTTC system including one embodiment of the invention. The FTTC system includes an element management system 150 executing on a computer system 101. The element management system allows a craftsperson (operator) to easily provision the many different types of elements in the FTTC system. That is, by communicating with software and hardware devices in the FTTC system, the EMS 150 allows an operator to modify the state of the equipment in the FTTC system and provide new services to subscribers. The EMS 150 also allows the operator to monitor the state of the equipment in the FTTC.

In one embodiment, the EMS 150 causes the computer system 101 to display a graphical representation of the status of the physical and logical elements in the network. One example of this graphical representation is the element provision display 151. The operator interacts with the graphical representation to command the EMS 150 to provision specific elements in the FTTC to support specific services.

As noted above, the EMS 150 executes on a computer system 101. In one embodiment, the computer system 101 includes a workstation available from Sun Microsystems, Inc. of Mountain View, Calif. Other embodiments of the invention use other computer systems, such as IBM PC compatible computers, Macintosh Computers, and IBM AS/400 computers. Other embodiments of the invention include a distributed EMS executing on multiple networked computer systems. What is important is that the computer system 101 includes some sort of processor, a memory, an input device, an output device, and a device for communicating with the HDT 100. The processor executes instructions to manipulate data in the memory. The input device accepts input from an operator while the output device displays graphical information to the operator. In one embodiment, the device for communicating with the HDT 100 includes a network interface card.

The computer system 101 communicates with a host digital terminal (HDT) 100 which allows the EMS 150 to communicate with the elements in the FTTC system. In the example of FIG. 1, the computer system 101 connects to the HDT 100 via an Ethernet connection to an Attachment Unit Interface (AUI) device 111 in the HDT 100. In one embodiment, an operator interacts with the EMS 150 locally via a direct connection to the HDT 100. In another embodiment, the operator interacts with the EMS 150 remotely via a connection through the PSTN switch 105, the ATM network 103. In yet another embodiment, the EMS 150 communicates with the HDT 100 via the Internet.

The Host Digital Terminal (HDT) 100 connects, by an optical fiber 109, to an Optical Network Unit (ONU) 110. The HDT 100 contains a number of HDT circuit packs which provide the hardware functionality for interconnection with external networks and with ONUs 110. These circuit packs include Optical Distribution Units (ODUs) 115 which provide the optical transmission and reception function for communication with the ONU 110. Also included in the HDT 100 is the Network Interface Unit 113 which connects to external networks, such as an ATM network 103 or a public switched telecommunications network (PSTN) switch 105.

The ONU 110 includes an optical receiver and transmitter to receive signals from and send signals to the HDT 100, as well one or more ONU circuit packs 140 which connect to residences 175 via twisted pair drop cable 124. In the residence 175, the in-home twisted pair cable 177 connects the telephone 185 to the twisted pair drop cable 124. In one embodiment, each ONU circuit pack 140 supports six twisted pair drop cable 124 connections.

In addition to the ONU circuit packs 140, an ONU 110 may contain one or more coax device circuit packs 120. The coax device circuit packs 120 connect to devices in residences 175 via a coaxial drop cable 128, a splitter 132, and in-home coaxial cable 134. Each coax device circuit pack 120 has two connections and thus allows connection to two coaxial drop cables 128. The in-home coaxial cable can be connected to a television settop box 178, which is in turn connected to a television 180, a Premise Interface Device (PID)/Active Network Interface Device (ANID) 183 which is in turn connected to a telephone 185, or a Computer Interface Device (CID) 188 which is turn connected to a computer 190.

In one embodiment, the HDT 100 includes sixty-four ONUs 110, each ONU supporting eight or sixteen residences 175. In this way an HDT 100 can support voice, video and data services for 512 to 1024 residences. Each coaxial drop cable 128 contains signals which support up to thirteen devices in the home, thus the total number of coaxial devices in the residences 175 served from one HDT 100 can be as high as 13,312. For field trials and trouble shooting, it is important that an operator be able to provision, including obtaining the state of, any of these 13,312 devices. The EMS 150 allows the operator to easily provision any of these devices.

The Host Digital Terminal (HDT) 100 connects to telecommunications networks via the PSTN switch 105, and networks for advanced services such as the Asynchronous Transfer Mode (ATM) network 103. The switch interface 107 to the PSTN switch 105 is defined by telecommunications standards, and in the US will typically be implemented by according to one of the Bellcore TR-008, TR-057 or TR-303 standards. There are differences between these standards as to how the individual channels are presented to the switch and as to how cross-connections between the DS1 and DS0 signals at the switch interface and FTTC platform are accomplished.

Telecommunications systems are based on standards which have evolved over many years and insure compatibility of equipment from different manufacturers. The standards provide clearly defined and precise specifications for different types of telecommunications services so that services are provided across geographic boundaries in a network with various generations of analog and digital telecommunications equipment. For FTTC systems, the Bellcore specification TA-NWT-000909, entitled "Generic Requirements and Objectives for Fiber in the Loop Systems," Issue 2, December 1993, provides a comprehensive description of the requirements for FTTC systems as well as signaling and transmission requirements for universal voice grade circuits.

Thus, the FTTC system can be controlled through the use of the EMS 150. The EMS 150 also provides the ability to monitor and control the devices in the HDT 100, ONU 110, as well as a number of devices in the residence 175, including the television settop box 178 and a Premise Interface Device (PID)/Active Network Interface Device (ANID) 183. The EMS works in conjunction with software which is distributed throughout the HDT 100, and ONU 100 to provide for a method and apparatus for element management.

B. Optical Network Unit Overview

Figure 2:
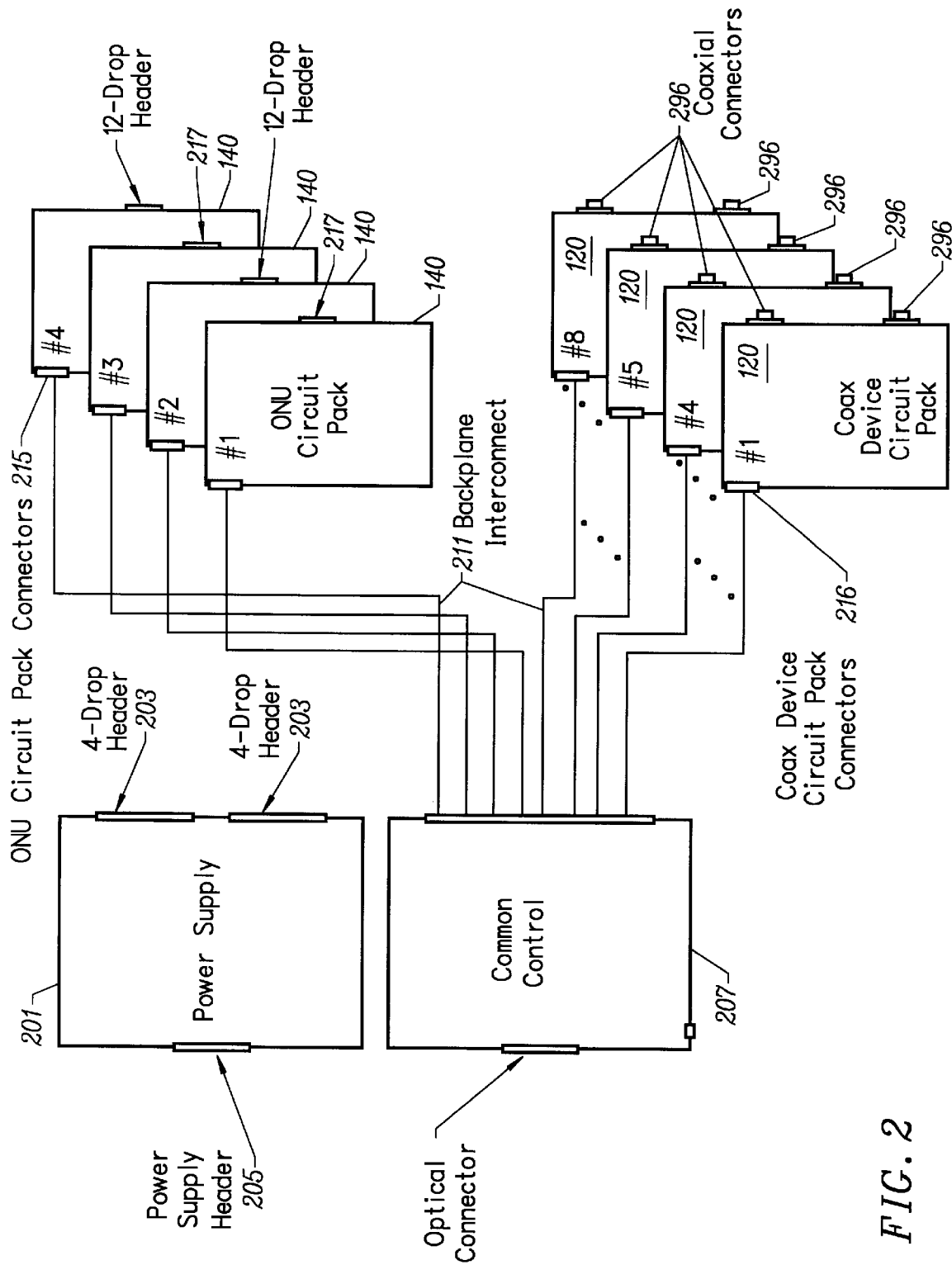
FIG. 2 illustrates the Optical Network Unit of the FTTC system.

The ONU 110 connects to the subscriber side of the HDT 100 and communicates with the devices in the residences 175. Therefore, to provision services for a subscriber in the residence 175, the EMS 150 communicates with the HDT 100, and the HDT 100 communicates with the ONU 110 to provide those services. A block diagram of ONU 110 is illustrated in FIG. 2.

In one embodiment, the ONU 110 includes a power supply 201 which connects to a cable carrying power at power supply header 205. The power supply 201 is also able to provide power to subscribers by connecting to twisted pair drop cable 124 at 4-drop header 203.

The common control 207 connects to the optical fiber 109 via an optical fiber connector 210. The common control 207 contains a microcontroller and software to monitor the various units which are operational in the ONU 110. The common control 207 also communicates with the HDT 100 regarding equipment and services supported by that particular ONU 110.

The backplane interconnects 211 connect the common control 207 with ONU circuit packs 140 and coax device circuit packs 120 via ONU circuit pack connectors 215 and coax device circuit connectors 216 respectively.

Connections to the twisted pair drop cable 124 are made at the ONU circuit pack 140 by the 12-drop header 217, which is capable of supporting up to twelve connections to twisted pair cable 124.

Connections to the coaxial drop cable 128 from the coax device circuit packs 120 are made via the coaxial connectors 296 on each coax device circuit pack 120.

As noted above, the ONU circuit pack 140 provides services over twisted pair. In one embodiment, the ONU circuit pack 140 includes services such as Plain Old Telephony services (POTs), Integrated Service Digital Network (ISDN) services, and can support coin services. The specific services which need to be supported by a FTTC platform are described in Bellcore specification TA-NWT-000909.

The coax device circuit pack 120 provides broadband services which are typically based on the use of Asynchronous Transfer Mode (ATM) as a low level transmission protocol. In one embodiment, the video services provided from the coax device circuit pack 120 include broadcast video services including reception of broadcast channels and pay-per-view programs. Pay-per-view programs are programs for which a subscriber requests access to a particular program and pays for that program. Provisioning of these services requires, among other things, provisioning of the cross-connect between a port in the HDT 100, receiving a signal from the ATM network 103, and a Virtual Path Identifier (VPI) and Virtual Channel Identifier (VCI) in the FTTC system. Cross-connection forms a Virtual Path Link (VPL) that allow the ATM data cells to communicate between the ATM network 103 and the ONU 110.

C. Element Management System Overview

As noted above, the EMS 150 allows an operator to work through a graphical user interface on a PC or workstation, to provision equipment, telephony services, and broadband services in an FTTC system. In addition, the EMS 150 provides for the monitoring and management of alarms associated with elements in the FTTC system. The following section describes, with respect to FIG. 3 through FIG. 8, the general architecture of the EMS 150 and generally how the EMS 150 communicates with, and ultimately effects the provisioning of, the equipment, the telephony services, and the broadband services in the FTTC system. After the description of the architecture, the next section describes, with respect to FIGS. 9 through 16, the graphical representations that an operator interacts with to effect the provisioning of the elements in the FTTC system. The last section describes a unique interface that allows operators to provision the FTTC system through an Internet based EMS 150.

D. Software Architecture

Figure 3:
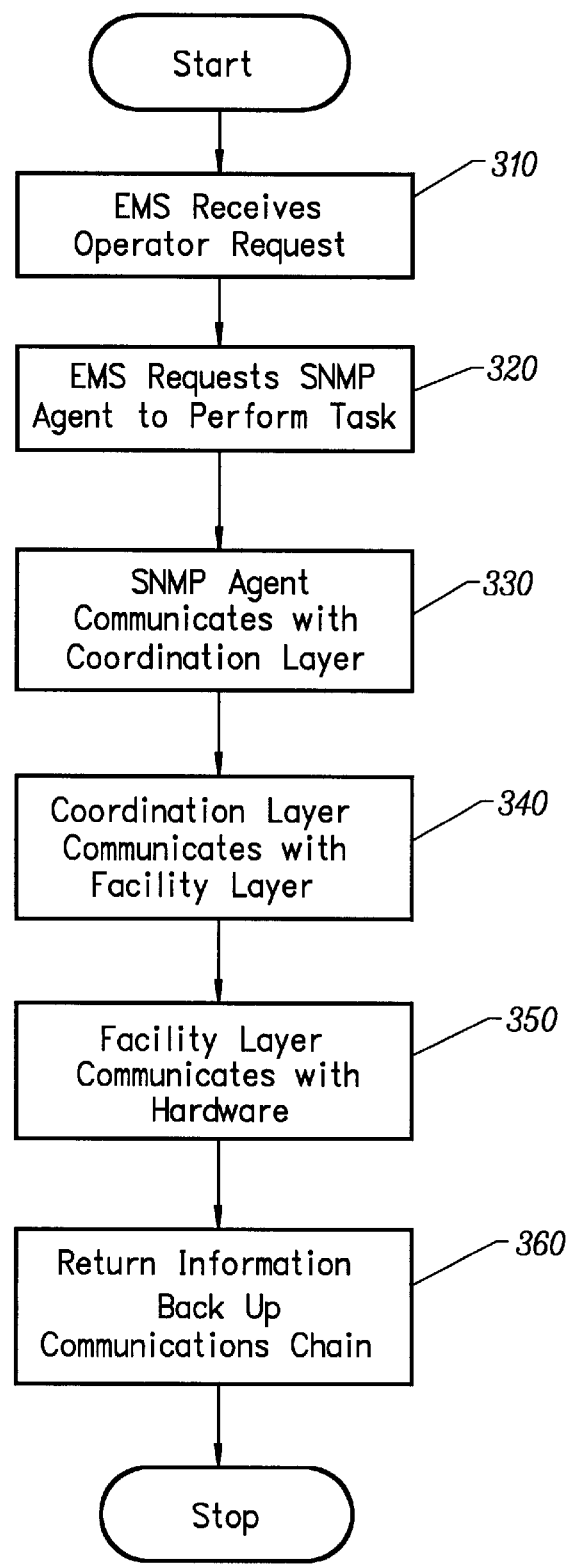
FIG. 3 illustrates a communications flow in an FTTC system having an EMS.
Figure 4:
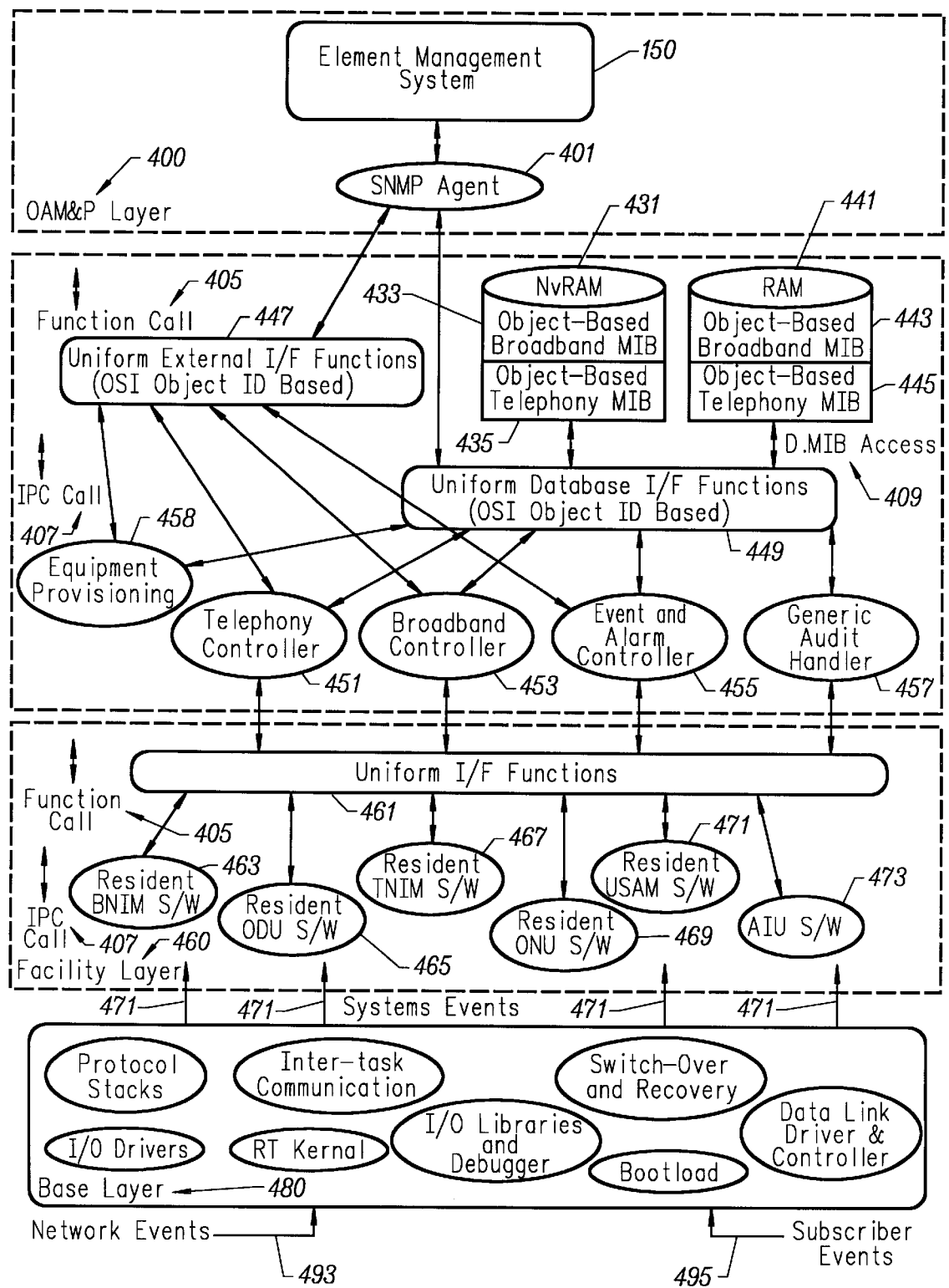
FIG. 4 illustrates an architecture, including an EMS, for a FTTC communications system.

FIG. 3 and FIG. 4 illustrate one embodiment of the architecture and general method used by the EMS 150 to effect the provisioning of equipment and services in the FTTC system. The following first describes the general architecture supported by the EMS 150, the HDT 100 and the ONU 110. Then the general method is described.

With reference to FIG. 4, the general architecture of the entire EMS/FTTC system includes four layers: the Operations, Administration, Maintenance and Provisioning (OAM&P) layer 400, the coordination layer 430, the facility layer 460, and the base layer 480. The OAM&P layer 400 includes the EMS 150 and the communications functions needed by the EMS 150 to communicate with the coordination layer 430. The coordination layer 430 is between the OAM&P layer 400 and the facility layer 460. The coordination layer 430 coordinates the provisioning of logical devices and services within the FTTC system. A logical device corresponds to some physical and/or non-physical device in the FTTC system. An example of a logical device is a port, VCI and VPI for an ATM connection. The facility layer 460 is responsible for interfacing directly with the physical elements in the FTTC system. For example, the facility layer 460 includes software for communicating and modifying the state of an ODU 115. The base layer 480 implements the general operating system functions of the real-time FTTC system, and provides system services to all the layers mentioned above.

1. OAM&P

In one embodiment, the OAM&P layer 400 includes the EMS 150 and the SNMP agent 401 software. The EMS 150 is described below in relation to FIG. 5 through FIG. 8. The SNMP agent 401 software allows the EMS 150 to communicate, via SNMP, with the HDT 100 and, in turn, the ONUs. One embodiment of the invention uses the SNMP agent software package by SNMP Research Inc., Nashville, Tenn.

2. Coordination Layer

In one embodiment, the coordination layer 430 software components execute primarily on the NIU 113 of the HDT 100. In one embodiment, the coordination layer 430 includes the following functional groups: the uniform external interface functions 447; the equipment provisioning 458; the telephony controller 451; the broadband controller 453; the event and alarm controller 455; the uniform database interface functions 449; the nonvolatile RAM store 431; and the volatile RAM data store 441. Each of the RAM stores include an object-based broadband Management Information Base (MIB) and an object based telephony MIB. In one embodiment, the coordination layer 430 also includes the generic audit handler 457.

The interfaces in the coordination layer 430 allows the EMS 150 to request information about, and change the state of, elements in the HDT 100 (and ultimately in the FTTC system) using SNMP without requiring the EMS 150 to know the internal workings of the coordination layer 430. The uniform external interface functions 447 is an Open Systems Interconnection standard object ID based interface that communicates with the SNMP agent 401 through function calls 405. The uniform external interface 447 converts requests from the SNMP agent 401 into inter-process communications calls 407 to other processes within the coordination layer 430. Similarly, the uniform database interface functions 449 is an OSI object ID based interface that communicates with the SNMP agent 401 through function calls 405, with other processes in the coordination layer 430 through interprocess communication calls 407, and with the data MIB access calls 409. The uniform database interface functions 449 coordinate translates requests from the SNMP agent 401 into the inter-process calls to the other processes in the coordination layer 430 and the MIBs.

In one embodiment of the invention, the HDT 100 includes both the RAMs in the NIU 113. In this embodiment, the HDT 100 does not have a hard disk, so any information needed to be kept over a power down or a reset (e.g., static cross-connect information, all provisioning information regarding which lines are enabled for service) is kept in the non-volatile random access memory (NvRAM 431). Other data is kept in the RAM 441 (e.g., dynamic cross-connect information). As noted above, each of the RAMs includes areas for storing data for telephony and broadband services (e.g., NvRAM 431 includes the object-based broadband MIB 433 and the object-based telephony MIB, while the RAM 441 includes the object-based broadband MIB 443 and the object-based telephony MIB 445.) Each of the MIBs provide object oriented data storage and manipulation features which are accessed by the uniform database interface functions 449.

In the coordination layer 430, a number of controllers perform tasks needed in the HDT 100 to provide the necessary telephony and broadband services to the subscribers and to provision the equipment in the FTTC. Each controller communicates, via interprocess communications calls 407 and function calls 405 to the various interfaces and other processes in the system. As noted above, in one embodiment of the invention, the coordination layer 430 includes a telephony controller 451, a broadband controller 453, an event and alarm controller 455 and a generic audit handler 457.

The telephony controller 451 is responsible for coordinating telephony services such as POTs and ISDN. Importantly, the EMS 150, through the uniform external interface 447 can inquire as to the state of a particular telephone service on a particular element in the FTTC system and command the telephony controller 451 to change the state of that element.

Similarly, the broadband controller 453 controls the broadband services provided by the HDT 100 (e.g., the state of video on demand connections and the provisioning of those connections). The broadband controller 453 implements the ATM multiplexing functions in the system. In one embodiment, the broadband controller 453 includes video controller functions. In another embodiment, the video controller is in a separate module. The ATM network 103 connections are established by provisioning or by switching, the broadband controller 453 is responsible for the provisioned connections. The broadband controller 453 is therefore responsible for maintaining the VC termination points and the VP termination points and the creation of cross-connects between the termination points.

The event and alarm controller 455 coordinates the events and alarms received from other parts of the system (e.g., from the ONU, from the facility layer 460) and forwards those events and alarms to the appropriate other parts of the system (e.g., the SNMP agent 401). In one embodiment, the event and alarm controller 455 also keeps track of the physical existence and status of the physical components in the HDT 100. Thus, the event and alarm controller 455 can be used in the automatic detection and provisioning of hardware components in the HDT 100. By providing the events and alarms to the EMS 150, the EMS can notify the operator when a particular event or alarm has occurred.

In one embodiment of the invention, each controller tracks and audits it's own data and resources associated with the services being provided by that controller. However, in a second embodiment, a separate audit handler, such as the generic audit handler 457, tracks the use of the different resources being used in the HDT 100. Irrespective of where the auditing function is performed, the auditing functions allow the EMS 150 to provide the operator with a complete picture of all of the physical and logical elements present in the FTTC system.

The equipment provisioning module 458 helps in the provisioning of equipment. In particular, the equipment provisioning module 458 helps auto-provision new devices in the HDT 100. For example, when a new ODU 115 is plugged into an HDT 100, the equipment provisioning module 458 helps automatically provision the new ODU 115. The equipment provisioning module 458 also helps in the direct provisioning performed through the EMS 150. This module communicates with the facility layer to provision various physical devices in the system.

Thus, the functional groups in the coordination layer 430 has been described. As noted above, these functional groups help provide the state and provision the state of the logical elements in the FTTC system. To provision the physical elements in the system, the facility layer 460 is used.

3. Facility Layer

The facility layer 460 includes the software for interfacing with the hardware in the HDT 100 and communicating this information to the coordination layer 430. The facility layer 460 software components execute on the NIU 113 and other devices in the HDT 100. The facility layer 460 software components communicate with the other hardware components in the HDT 100.

In one embodiment, the facility layer 460 includes the following functional groups: 10 the uniform interface functions 447; the resident BNIM software 465; the resident ODU software 465; the resident TNIM software 467; the resident ONU software 469; the resident Universal Service Access Multiplexor (USAM) software 471; and the Attachment Unit Interface (AUI) software 473.

The facility layer 460 includes the software for interfacing with the hardware in the HDT 100 and communicating this information to the coordination layer 430. For example, in one embodiment, the facility layer 460 includes the resident BNIM software 465 to monitor the SONET protocol optical inputs (OC3 and OC12 rate fiber optical connections) in the NIU 113. The resident BNIM software 463 communicates with the event and alarm controller 455 if there is a problem with one of the optical inputs. The event and alarm controller 455 can then take appropriate action, including in one embodiment contacting the EMS 150.

In one embodiment, the facility layer 460 includes the uniform interface functions 461, resident BNIM software 463, resident ODU software 465, resident TNIM software 467, resident ONU software 469, resident USAM software 471 and AUI software 473. The uniform interface functions 461 operate in a similar fashion to the other interfaces in the coordination layer 430. The resident BNIM software 463 interfaces with, for example, the subscriber side of the resident SONET interface. The resident ODU software 465 runs on the ODU 115, and controls, for example, a SONET link fiber connection from the ODU 115 to the ONU 110. Using the resident ODU software, from the EMS 150, the operator can see which ODUs 115 are provisioned. The resident TNIM software 467 controls the DS1 interface with the PSTN switch 105. The resident TNIM software 467 supports one important feature of the embodiment of the invention, the display of dynamic cross-connects. The resident ONU software 469 communicates with the ONU 110s. The resident ONU software 469 ensures that the digital DS1 is communicated to the ONU 110 so that, for example, the ONU 110 can convert the digital signal into analog signals and provide a subscriber with plain old telephone service. The EMS 150 communicates with the resident ONU software 469 to provision the various cards in the ONU 110. In one embodiment, the resident USAM software 471 replaces the resident ONU software 469 to support different devices rather than ONUs 110. The AUI software 473 supports the Ethernet connection to the EMS 150.

4. Base Layer

The base layer 480 implements the basic real-time operating system for the HDT 100. Importantly, the base layer 480 helps the other layers to process the network side events 493 and the subscriber side events 495 received by an HDT 100.

In one embodiment, the baser layer 480 includes the following elements: protocol stacks, inter-task communication, input/output drivers, real-time kernel, input/output libraries and debuggers, switch-over and recovery, bootload, and data link driver and controller. The protocol stacks keep track of information being communicated in the system. The switch-over and recover helps switch between the two processors running in the HDT 100 while the HDT is running. The switch-over and recovery also allows the HDT 100 to recover from a failure. The other above noted elements are self explanatory.

Other embodiments of the invention use other elements in the base layer 480. In other embodiments of the invention, where no operating system exists, the functionality of the base layer 480 is implemented in the facility layer 460. What is important is that basic real-time operating system functions are supported somewhere in the HDT 100.

5. General Operation of the EMS/FTTC System

FIG. 3 illustrates the general operation of an EMS state information request or provisioning operation. A detailed example is described after the general example.

At step 310, the operator interacts with the EMS 150 to request some operation (e.g., a state information request or a provisioning operation).

At step 320, the EMS 150 interprets the interactions from the operator and generates one or more requests of the SNMP agent 401.

At step 330, the SNMP agent 401 communicates with the coordination layer 430 requesting the information or operation needed by the EMS 150.

At step 340, the coordination layer 430, if necessary, further communicates with the facility layer 460 to execute the SNMP agents 401 request. However, if the coordination layer 430 can respond without accessing the facility layer 460, then the coordination layer 430 will do so (this may occur where the only information needed by the SNMP agent 401 is stored in the RAM stores).

At step 350, the facility layer 460 communications with the hardware, via one of the software modules described above, to return the information requested by the coordination layer 430.

At step 360, the information is passed back up through the communications chain to the EMS 150. The EMS 150 then presents the information to the operator.

Importantly, at any step in the above operation, multiple calls may be made between layers to complete any one task. For example, a provisioning request by the EMS 150 may require the SNMP agent to request multiple actions of the coordination layer 430. Similarly, the coordination layer 430 may need to make multiple requests of the facility layer 460. Also note that the base layer 480 is supporting the real-time operations of the various processes executing in the other layers and allows, for example, multiple processes to communicate with each other.

E. Operation

Figure 5:
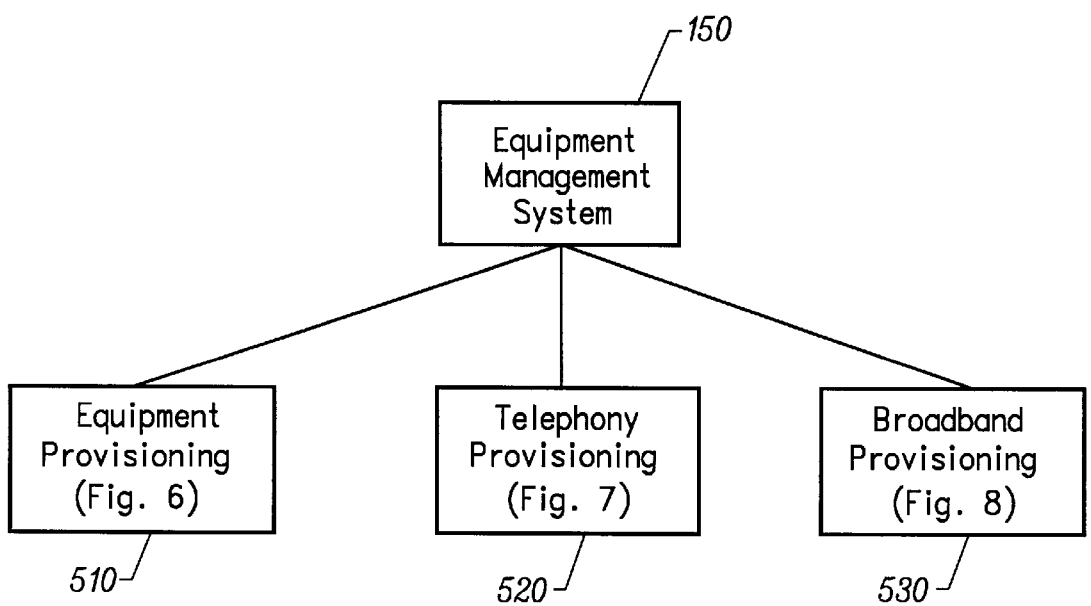
FIG. 5 illustrates an organization of functions for element management.

FIG. 5 represents the functional organization of EMS 150 and indicates the choices which would be presented to an operator through the graphical user interface, including equipment provisioning 510, telephony provisioning 520, and broadband provisioning 530. The following describes how each of these provisioning functions include further subfunctions. The functions and subfunctions are described in greater detail with regard to FIG. 9 through FIG. 16.

Figure 6:
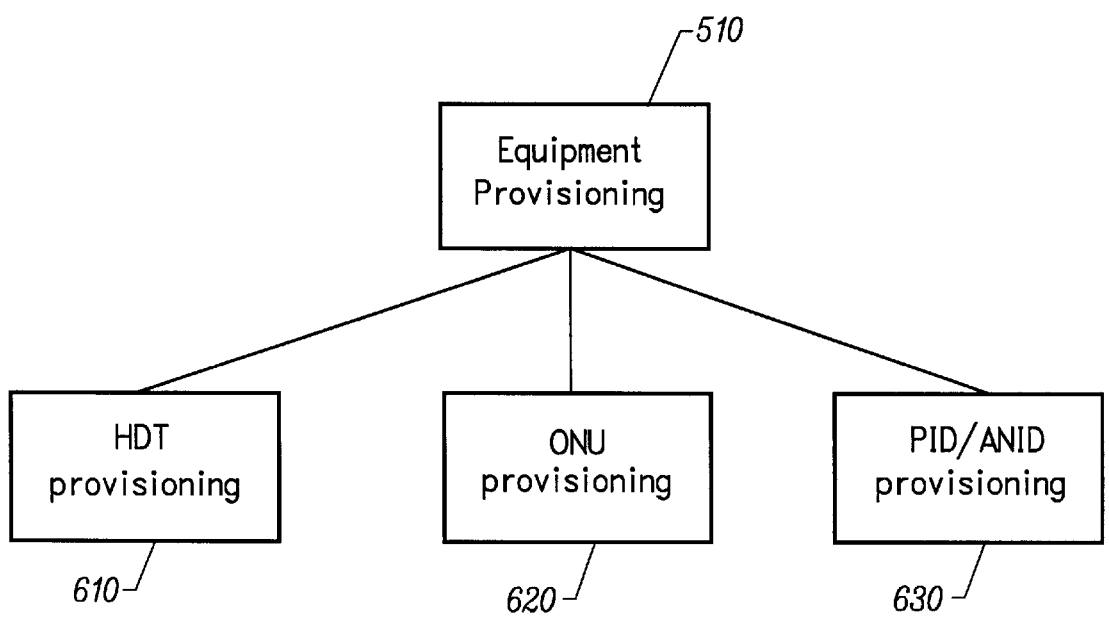
FIG. 6 illustrates an organization of functions for equipment provisioning.

The equipment provisioning 510 allows the operator to provision equipment in both the HDT 100 and the ONU 110. As illustrated in FIG. 6, within equipment provisioning there exists the choices of HDT provisioning 610, ONU provisioning 620, and PID/ANID provisioning 630.

Figure 7:
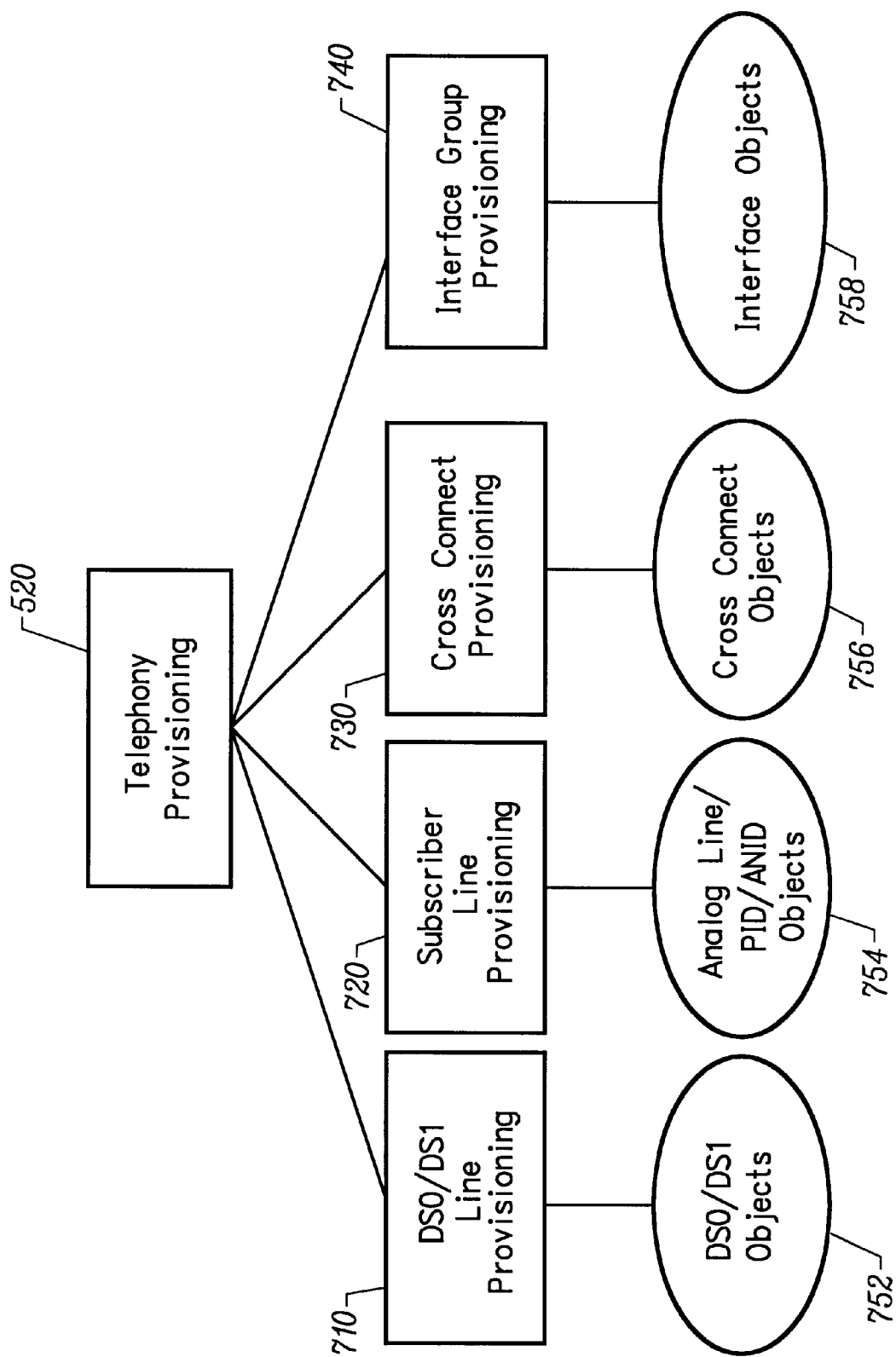
FIG. 7 illustrates an organization of functions for telephony provisioning.

Service provisioning is required for both telephony and broadband services. For telephony provisioning 520, as illustrated in FIG. 7, the options are DS0/DS1 line provisioning 710, subscriber line provisioning 720, cross-connect provisioning 730, and interface group provisioning 740. In order to effect the changes in the FTTC system, the EMS 150 contains software objects which include DS0/DS1 objects 752, analog line/PID/ANID objects 754, cross-connect objects 756, and interface objects 758.

Figure 8:
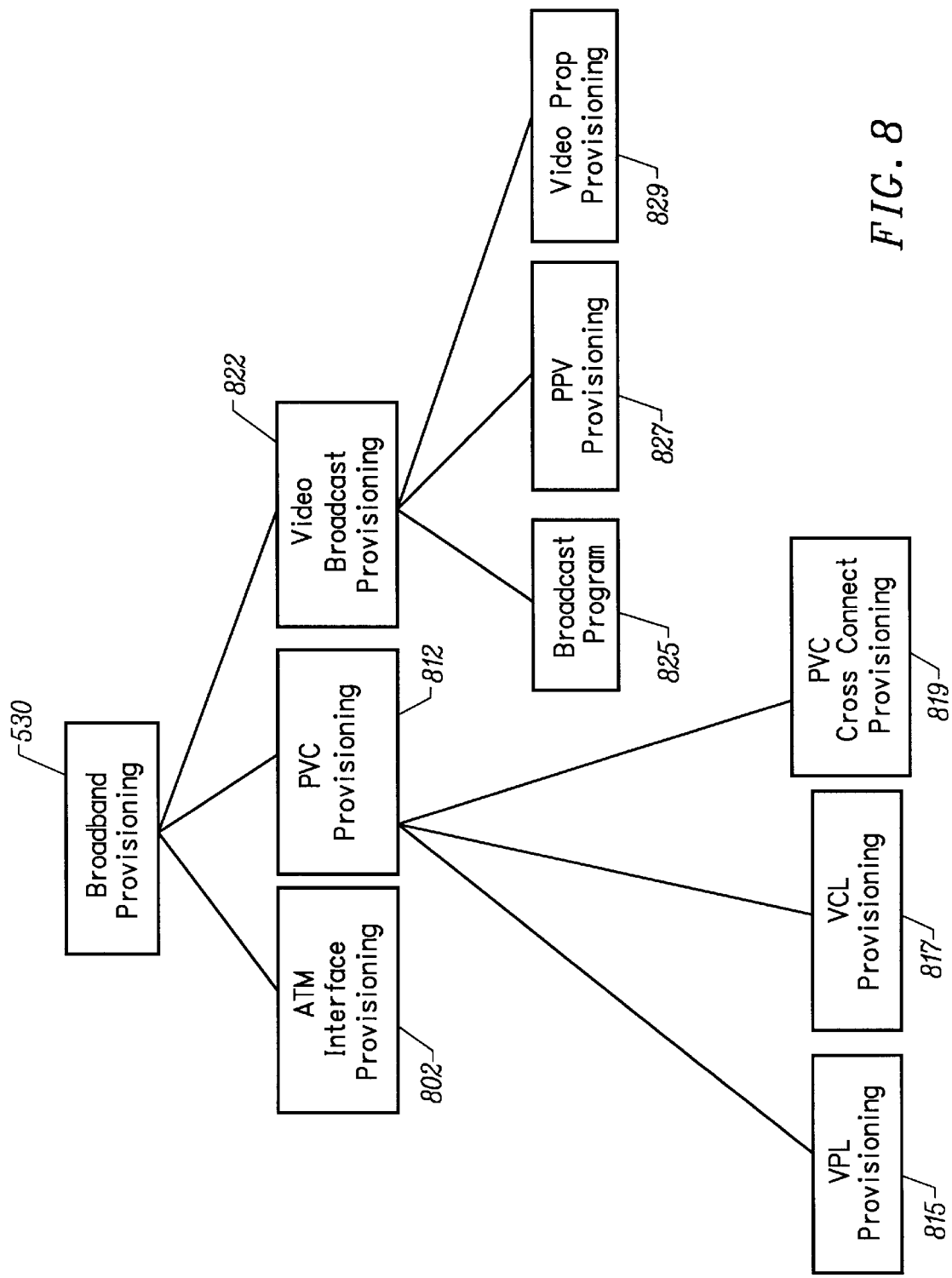
FIG. 8 illustrates an organization of functions for broadband provisioning.

For broadband provisioning 530, the functional organization and user choices are illustrated in FIG. 8, where it can be seen that the operator can choose from ATM interface provisioning 802, Permanent Virtual Circuit (PVC) provisioning 812, and video broadcast provisioning 822. Within the choice of PVC provisioning 812 there exists the possibilities of Virtual Path Link (VPL) provisioning 815, Virtual Channel Link (VCL) provisioning 817, and PVC cross-connect provisioning 819.

In one embodiment of the invention, the EMS 150 presents the user with a graphical representation of map including icons representing the physical location of equipment in the FTTC system. For example, the map may be of the San Francisco Bay area and show a number of HDTs 100 located around the Bay area. From this map, the user can select a specific HDT 100 to provision or from which to obtain information.

F. Equipment Provisioning

Figure 9:
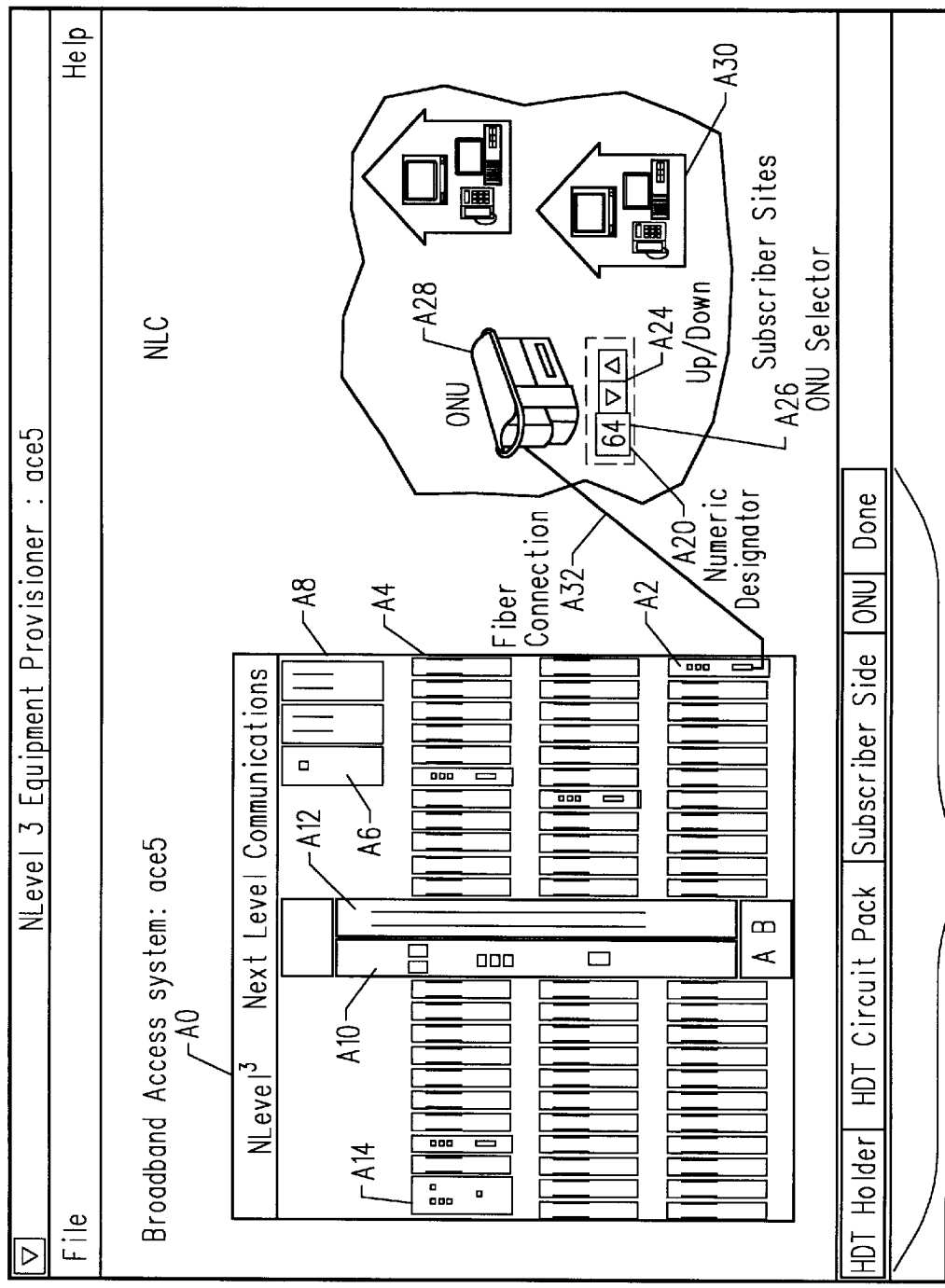
FIG. 9 illustrates the function of provisioning Host Digital Terminal equipment.

In operation, the EMS 150 presents screens to the operator on a display device, and the operator selects choices using some kind of input device(s), for example, a mouse and keyboard. When the operator selects equipment provisioning 510 for a particular HDT 100 from the map, a graphical representation of that HDT 100 is displayed. FIG. 9 illustrates one example graphical representation of an HDT 100.

Note that in the example of FIG. 9, the HDT 100 is shown approximately as it physically appears. This provides an operator with a much more intuitive interface. In one embodiment of the invention, the HDT 100 is shown photorealistically, further enhancing the ease of use of the system. The HDT representation A0 contains graphical representations of both the full and empty slots in the HDT 100 including a Network Interface Unit (NIU) representation A10 and NIU empty slot representation A12, a power supply representation A6 and a power supply empty slot representation A8, and Optical Distribution Unit representation A2 and an Optical Distribution Unit empty slot representation A4, and an Alarm Interface Unit (AU) representation A14. The EMS 150 learns which slots are full and which slots are empty by communicating with the particular HDT 100, as described above.

The screen illustrated in FIG. 9 also contains an ONU representation A28, and subscriber site representations A30. An ONU selector A26 is presented which contains a numeric designator A20, and up/down controls A24. A fiber connection representation A32 serves to illustrate the connection between a particular ODU and ONU 110. The operator can select the appropriate ONU 110 by using the up/down controls A24 within the ONU selector A26 to select an ONU 110. The number of the ONU selected will be illustrated by the numeric designator A20. The fiber connection representation A32 graphically illustrates the connection to an ODU 115 by virtue of the fact that the fiber connection representation A32 terminates on an ODU representation A2 which is in the same relative location in the HDT representation A0 as the location of the physical ODU 115 in the HDT 100. Having identified an ONU 110 using the ONU selector A26, the operator could approach the HDT 100 and easily locate the ODU 115 serving that ONU 110.

A set of equipment provisioning options A40 is presented on the screen in the form of buttons, which when clicked with the mouse, will take the subscriber to a particular function within equipment provisioning 510.

Figure 10:
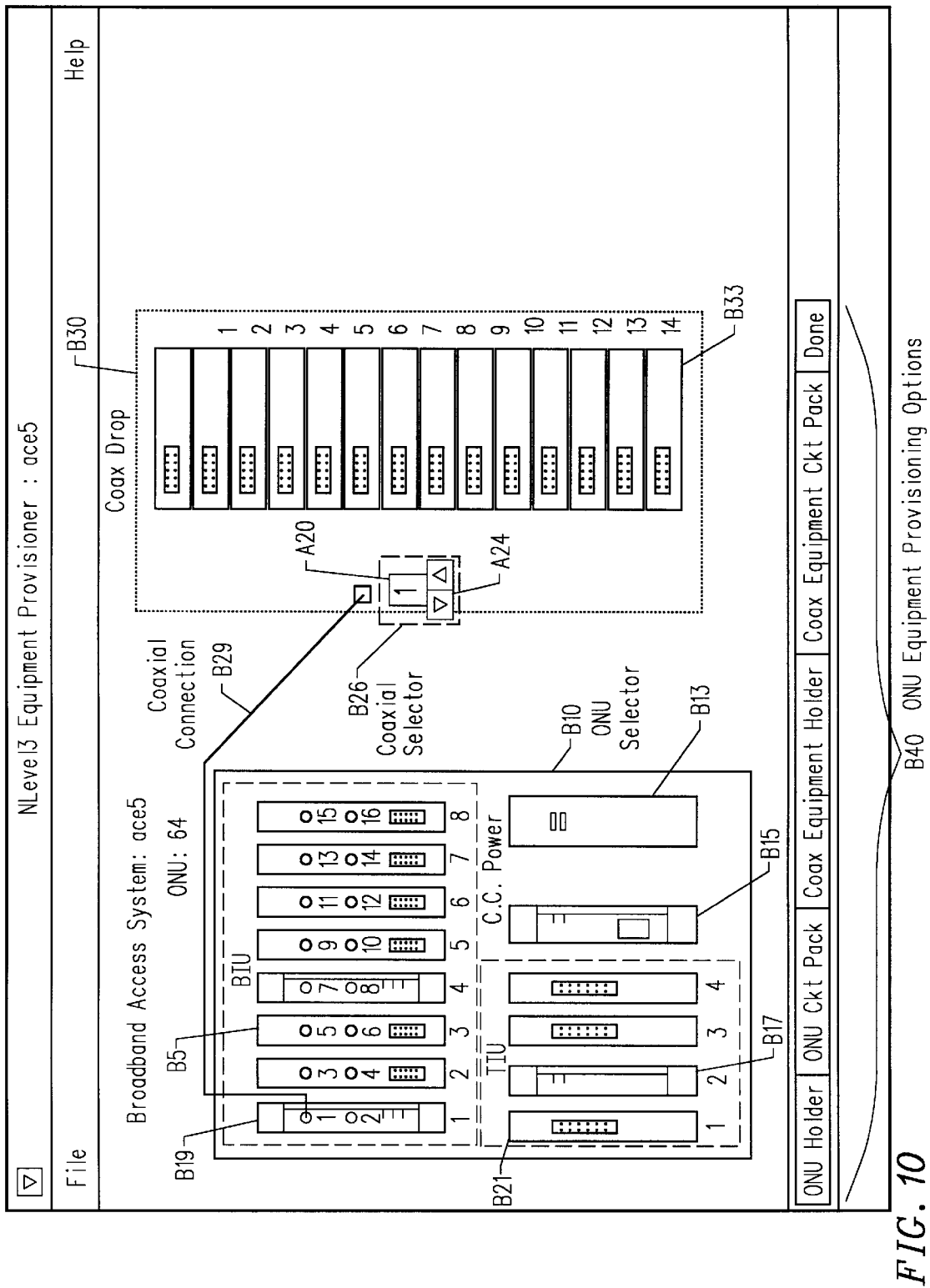
FIG. 10 illustrates the function of provisioning Optical Network Unit equipment.

Equipment provisioning within the ONU 110 is illustrated in FIG. 10. FIG. 10 shows a screen presented to the operator which contains an ONU representation B10, an ONU circuit pack representation B19, an ONU circuit pack empty slot representation B5, a common control representation B15, a power supply representation B13, a coax device circuit pack representation B19, and a coax device circuit pack empty slot representation B21. A coax drop panel B30 is also presented, and device representations B33 are used to illustrate the devices in the residence which are served by the coax device circuit pack 120.

A coaxial selector B26 is presented which allows the operator to select a coaxial drop cable 128 and determine to which coax device circuit pack 120 the coaxial drop cable 128 is connected. The operator can select the appropriate coaxial drop cable 128 by using the up/down controls A24 within the coaxial selector B26. The identifying number of the selected coaxial drop cable 128 will be illustrated by the numeric designator A20. A coaxial cable representation B29 is presented to indicate the connectivity to the user. As with the HDT provisioning 610, the ONU provisioning 620 in the EMS 150 obtains all of the information from the specific ONU 110 through the communications process described in FIG. 3.

A set of ONU equipment provisioning options B40 is presented on the screen in the form of buttons, which when clicked with the mouse, will take the operator to a particular function within ONU equipment provisioning 620.

If the operator selects PID/ANID provisioning 630 within equipment provisioning 510, the operator can determine the state of devices connected to an ONU 110 and change some state information. As noted previously, the coax cable coming from the ONU 110 supports up to fourteen devices, each device being a NID/PID. A NID is a device powered by the network, while a PID is powered by the home. Examples of PIDs are set top boxes. The PID/ANID provisioning 630 allows the operator to see the state of specific devices in a subscribers residence 175.

G. Telephony Service Provisioning

In order to provision telephony services, it is necessary to represent to the operator the connection to a subscriber, and allow the operator to request that a particular service be made operational over that connection. To completely connect a subscriber to the PSTN switch 105, the operator provisions both the network and subscriber sides of the HDT 100. Importantly, from the perspective of ease of implementation, all of the provisioning subfunctions under the telephony provisioning 520 are implemented, in one embodiment, using object based on the Bellcore GR2833 and GR303 standards. This makes the support of new telephony services relatively easy to implement for EMS by simply adding new objects.

To provision the network side, the operator need access the DS0/DS1 line provisioning 710. The operator is presented with a graphical representation of the DS1 and DS0. A particular DS1/DS0 pair can be selected to support a particular communications protocol for communicating control information between HDT 100 and the PSTN switch 105.

Figure 11:
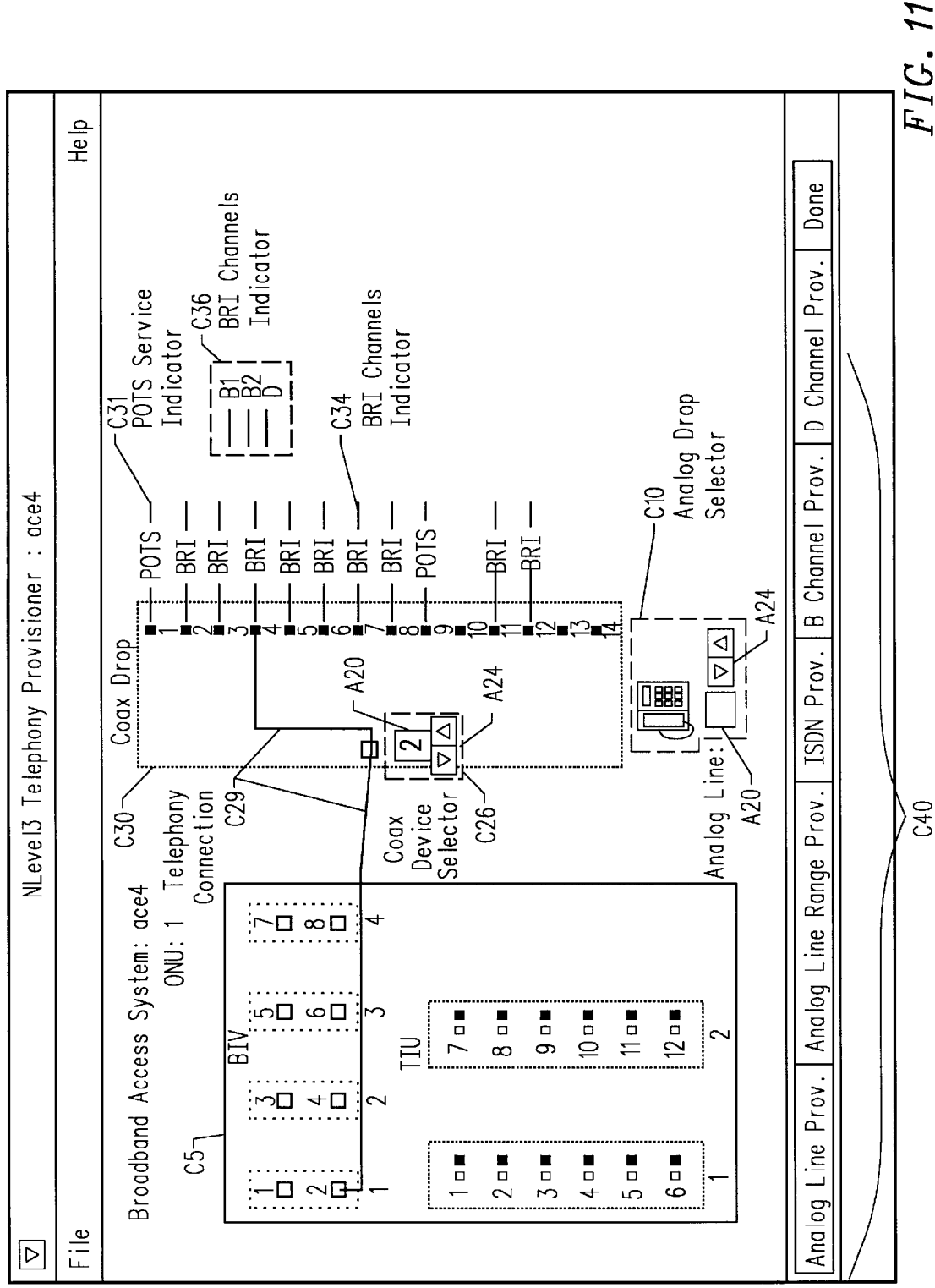
FIG. 11 illustrates the function of subscriber side provisioning of telephony services.

Another part of the provisioning between the PSTN 105 and the subscriber is the subscriber line provisioning 720. An example of a graphical representation displayed for an operator to facilitate subscriber line provisioning 720 is illustrated in FIG. 11. As shown in FIG. 11, the operator is presented with an ONU service representation C5 which illustrates the ONU circuit packs 140 and coax device circuit packs 120 which are in service. A coax drop service panel C30 is also presented which presents to the operator with a graphical representation of the connectivity to a device, and the telephony service provided by that device. The connections are represented using a telephony connection representation C29. A coax device selector C26 is used to select a device. The operator can select a particular device by using the up/down controls A24 and reading the numeric designator A20.

Services are represented on coax drop service panel C30 as with telephony service indicators including a POTs service indicator C31, and a Basic Rate ISDN (BRI) service indicator C34. A BRI channels indicator C36 is used to illustrate how the first bearer (B1), second bearer (B2) and data (D) channels are provisioned. That is, the B1, B2, and D channels are shown so that the operator can have the EMS 150 perform OAM&P operations on these channels.

Other telephony services which are provided over the coaxial network can also be represented in a manner similar to that used for the POTs and BRI services. Other services can include, but are not limited to, coin and Digital Data Services. In one embodiment, the types of services which are graphically represented can be determined from Bellcore specification TA-NWT-000909.

The provisioning of analog lines comprised of ONU circuit packs 140 connected to twisted pair drop cable 124 can also be represented graphically. The operator can choose a particular analog drop by using an analog drop selector C10, as shown in FIG. 11.

A set of telephony provisioning options C40 is presented on the screen in the form of buttons, which when clicked with the mouse, will take the subscriber to a particular function within telephony provisioning 520.

The telephony provisioning 520 provides cross-connect provisioning 730 which connects a subscriber side HDT connection to a particular DS0 in a particular DS1 of the network side. The cross-connects can be either static or dynamic.

In static cross-connect provisioning, services are provided to a subscriber on a specific DS0 which is associated with a DS1. Cross-connection provisioning involves establishing the relationship between a particular DS0 in a DS1 and a service drop, which may be a coaxial drop cable 128 or a twisted pair cable 124.

Figure 12:
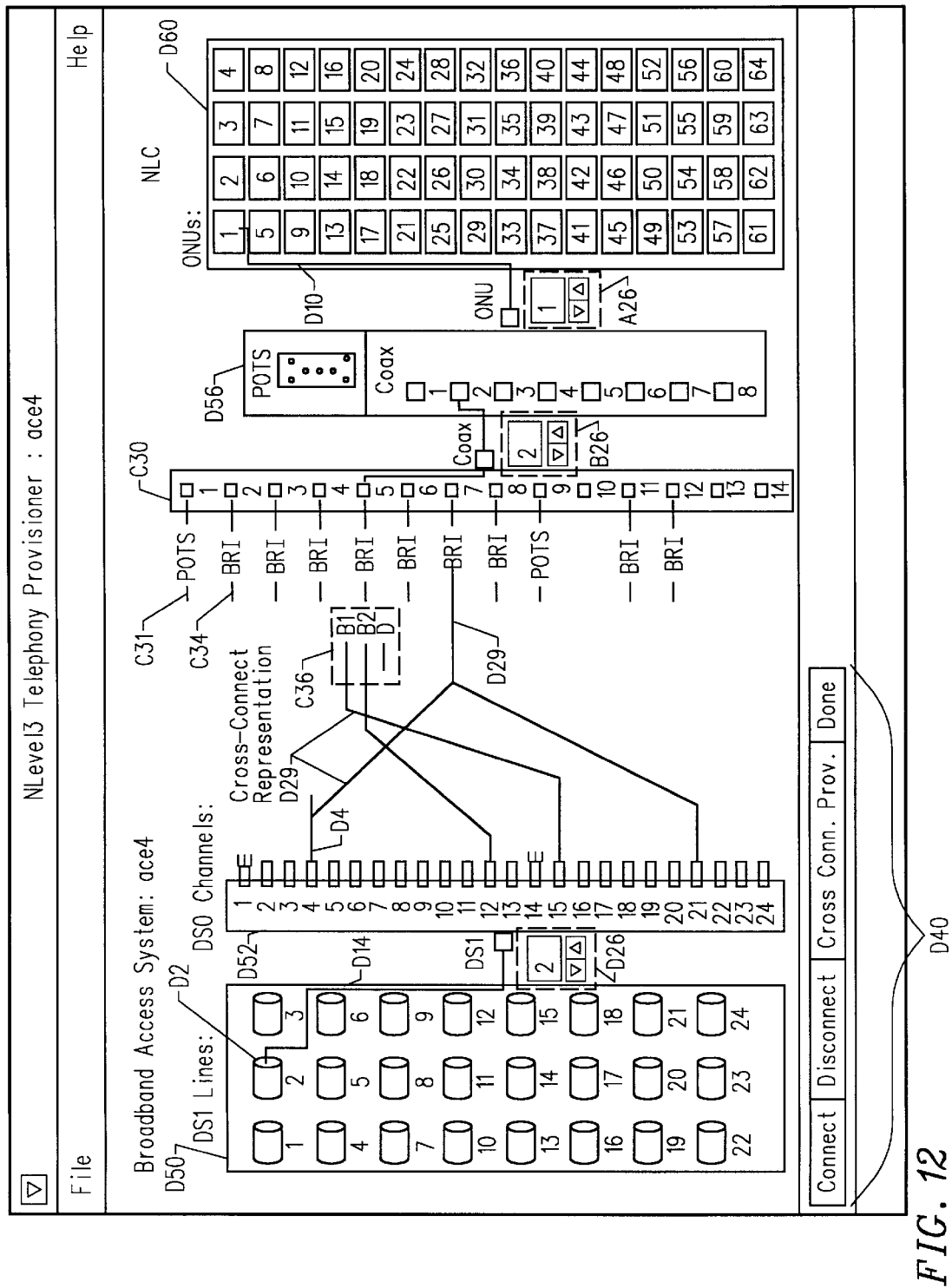
FIG. 12 illustrates the function of network side provisioning of telephony services.

FIG. 12 illustrates the screen which is displayed to the operator during static cross-connect provisioning. Included in this screen are a DS1 panel D50, a DS0 panel D52, a coaxial device panel D54, a coax drop service panel C30, and an ONU panel D60. The operator can select a DS1 D2 using a DS1 selector D26. The DS1 connection is illustrated using a DS1 connection representation D14.

The DS0 panel D54 has DS0 representations D4 which illustrate the individual DS0s within the DS1. On the coaxial drop service panel C30, there are POTs service indicators C31, Basic Rate ISDN (BRI) service indicators C34 and BRI channels indicator C36. Coaxial selector B26 is used to determine which coaxial drop cable 128 is being provisioned. A coaxial device connection indication D12 is used to display the relationship between a specific coaxial drop cable and a coaxial cable device.

The relationship between an ONU 110 and a coaxial drop cable 128 is illustrated using a ONU-coaxial cable connection representation D10. The operator is able to choose an ONU 110 using ONU selector A26, and to choose a coaxial drop cable 128 using coaxial selector B26. Having selected the ONU 110 and coaxial cable it is possible to display the cross-connect representation D29 which illustrates to the operator what services are carried in a particular DS1/DS0 combination over a particular coaxial drop cable 128.

Cross-connect provisioning options D40 allow the operator to connect or disconnect a service on a drop to a particular DS0. Although the preceding description has been given for telephony services provided over the coaxial drop cable 128, telephony services are also provided over twisted pair drop cable 124, and the technique discussed above is used to present the cross-connect information for an telephony service from a DS1/DS0 provided over the twisted pair drop cable 124.

In some embodiments of the switch interface 107, the cross-connections are not permanent, but are dynamically allocated each time a call is received or placed. This is the case in the TR-303 switch interface, in which the HDT 100 receives commands from the PSTN switch 105 which indicate which DS1/DS0 combination should be used for a particular call. (Note that the network side DS0/DS1 line provisioning 710 can be used to select which DS1/DS0 is to be used by the HDT 100 and the PSTN switch 105 to communicate the commands.)

In order to monitor the cross-connection representations in a situation where the DS1/DS0 combinations are dynamic, it is necessary to have both a representation of that cross-connection, as well as a means of updating the display of the cross-connection information. Having accurate cross-connection information is important, especially for the purpose of troubleshooting faulty connections or services which are not operating properly.

Figure 13:
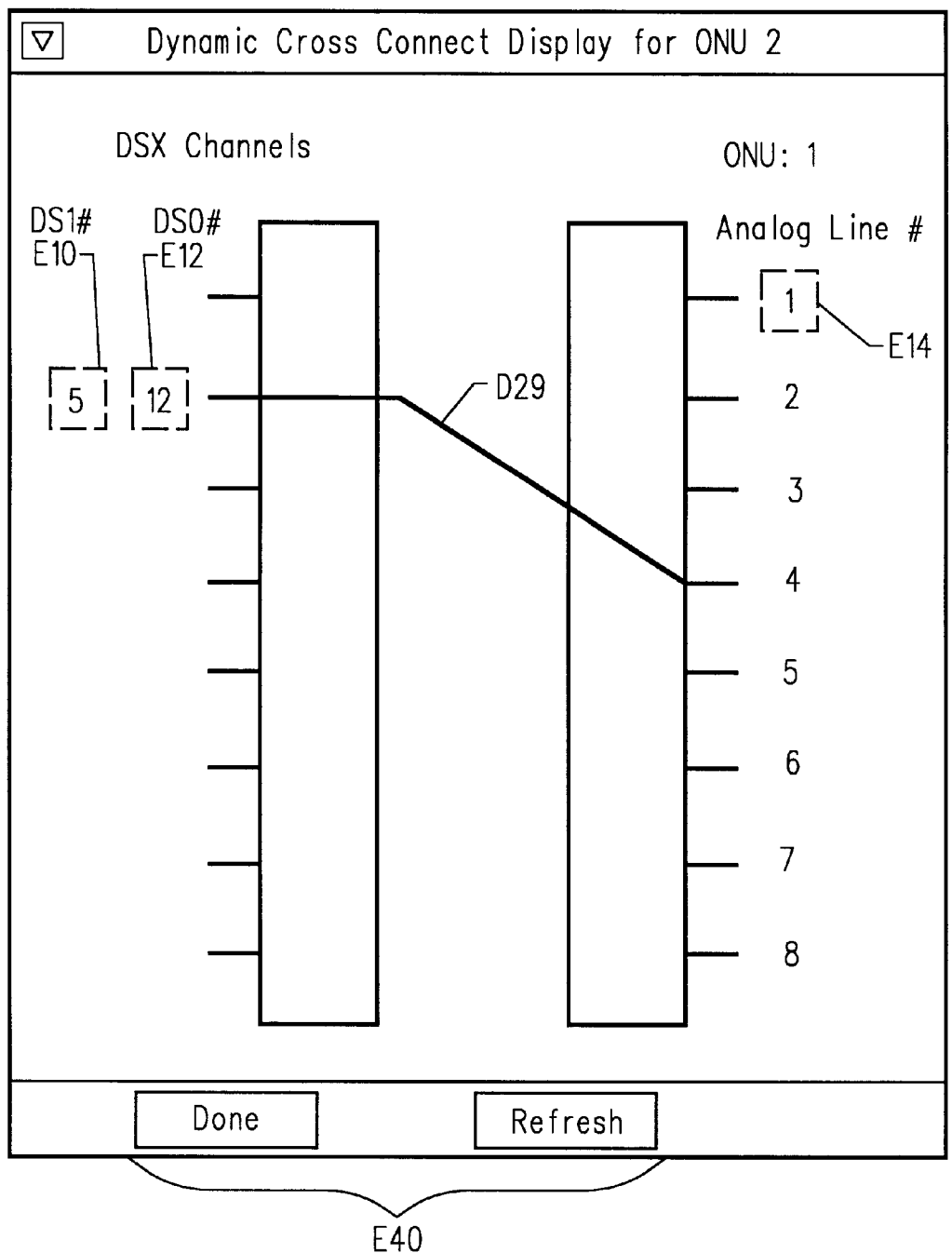
FIG. 13 illustrates the dynamic cross-connect representation.

FIG. 13 illustrates a screen which presents the dynamic cross-connection information to the operator. A DS1 numeric indicator E10 is used in combination with a DS0 numeric indicator E12 to indicate a particular DS1/DS0 combination. In the case of analog lines, an analog line numeric indicator E14 is used to illustrate which twisted pair drop cable 124 is being referred to. The cross-connection representation D29 displays the cross-connect information to the operator.

Dynamic cross-connect monitoring options E40 are presented to the operator, and allow the operator to update the screen by clicking the appropriate screen button with the mouse. Upon this request, the EMS 150 sends a message through the SNMP agent 401, through the coordination layer 430, and to the facility layer 460, where communication with the cross-connect hardware in the HDT 100 takes place, and a message containing the cross-connect DS1/DS0 is returned, via the coordination layer 430 to the EMS 150 which updates the EMS provisioning display 151. The TNIM software 467 communicates with the HDT 100 hardware to establish and track the dynamic cross-connects.

Automated updating of the dynamic cross-connect information is also possible, in which the EMS 150 automatically updates the EMS provisioning display 151 by initiating requests for cross-connect information. The automatic updating may be periodic and based on a timer. An example of this is the automated updating of the screen in every few seconds. Alternatively, updating may be done based on external events (e.g., network events 493 and/or subscriber events 495), such as the arrival or generation of a call on a particular DS1/DS0 pair. In another embodiment, the resident TNIM software 467 includes parameters and software to selectively enable a notification feature. The notification feature transmits the cross-connect information to the EMS 150 when the cross-connect information for a particular ONU 110 changes.

In another embodiment, the operator In one embodiment, the operator does not select a specific ONU, instead the user selects a particular DS1. In this embodiment, the EMS displays, based on the DS1, which subscriber lines are dynamically connected to the that DS1.

In one embodiment, both dynamic and static cross-connects are displayed by the EMS 150. In this embodiment, the static cross-connect information is also obtained from the resident TNIM software 467.

Returning to the telephony provisioning 520 subfunctions, the interface group provisioning 740 allows the operator split DS1s into different protocol groups (e.g., one group assigned to TR-08 and another group being TR-303).

H. Broadband Service Provisioning

Broadband services are an important part of the FTTC platform service offering, and include digital broadcast programs and Pay-Per-View (PPV) events. PPV channels often use a "barker" channel which is a channel used to advertise upcoming PPV events. Typically, the subscriber may tune to what is believed to be a PPV channel, but in actuality the barker channel is presented to the subscriber until the PPV event is purchased, at which time access to the actual PPV program is authorized.

Figure 14:
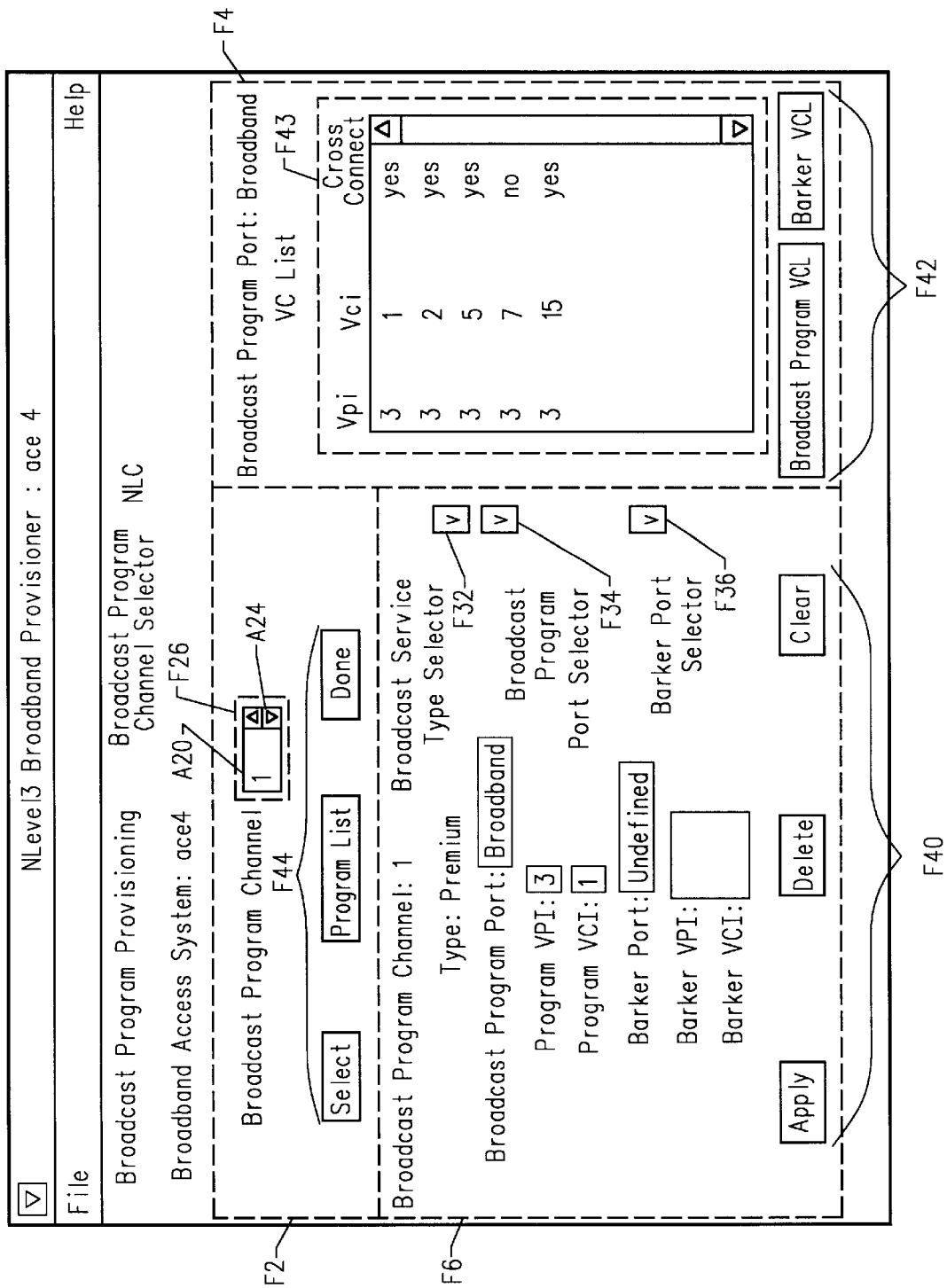
FIG. 14 illustrates the broadcast program provisioning function.

FIG. 14 illustrates a screen presented to the operator for broadcast program provisioning 825. Broadcast provisioning 530 includes video broadcast provisioning 822, ATM interface provisioning 802 and PVC provisioning 812. The screen shown in FIG. 14 includes a broadcast program channel selection panel F2, a broadcast program services channel F6, and a broadcast program Virtual Channel (VC) panel F4. The video broadcast provisioning 822 includes broadcast program functions 825, the PPV provisioning 827 and the video prop provisioning 829. The PVC provisioning 812 includes the VPL provisioning 815, the VCL provisioning 817 and the PVC cross-connect provisioning 819.

The broadcast program channel selection panel F2 contains a broadcast program channel selector F26, a numeric indicator A20, and up/down controls A24. Broadcast program selection options F44 are also presented to the operator.

The broadcast program services channel F6 presents information regarding the selected broadcast program channel, and allows the operator to vary parameters related to the broadcast program. Included are a broadcast service type selector F32 which allows the operator to provision the channel as a basic channel which is included in a basic monthly subscription fee, a premium channel for which there are additional charges, or a PPV channel for which access is granted on a per-event basis. A broadcast program port selector is used to select from which port on the HDT 100 the service originates. The barker port selector F36 is used to select the port the Barker channel originates on. Broadcast program services options F40 are presented to the subscriber to apply the requested changes to the FTTC network elements.

The broadcast program VC panel F4 contains a broadcast program VC list F43, and broadcast program list options F42 which allow the operator to display particular VC lists, including but not limited to, the broadcast program virtual channel links and barker virtual channel links.

Figure 15:
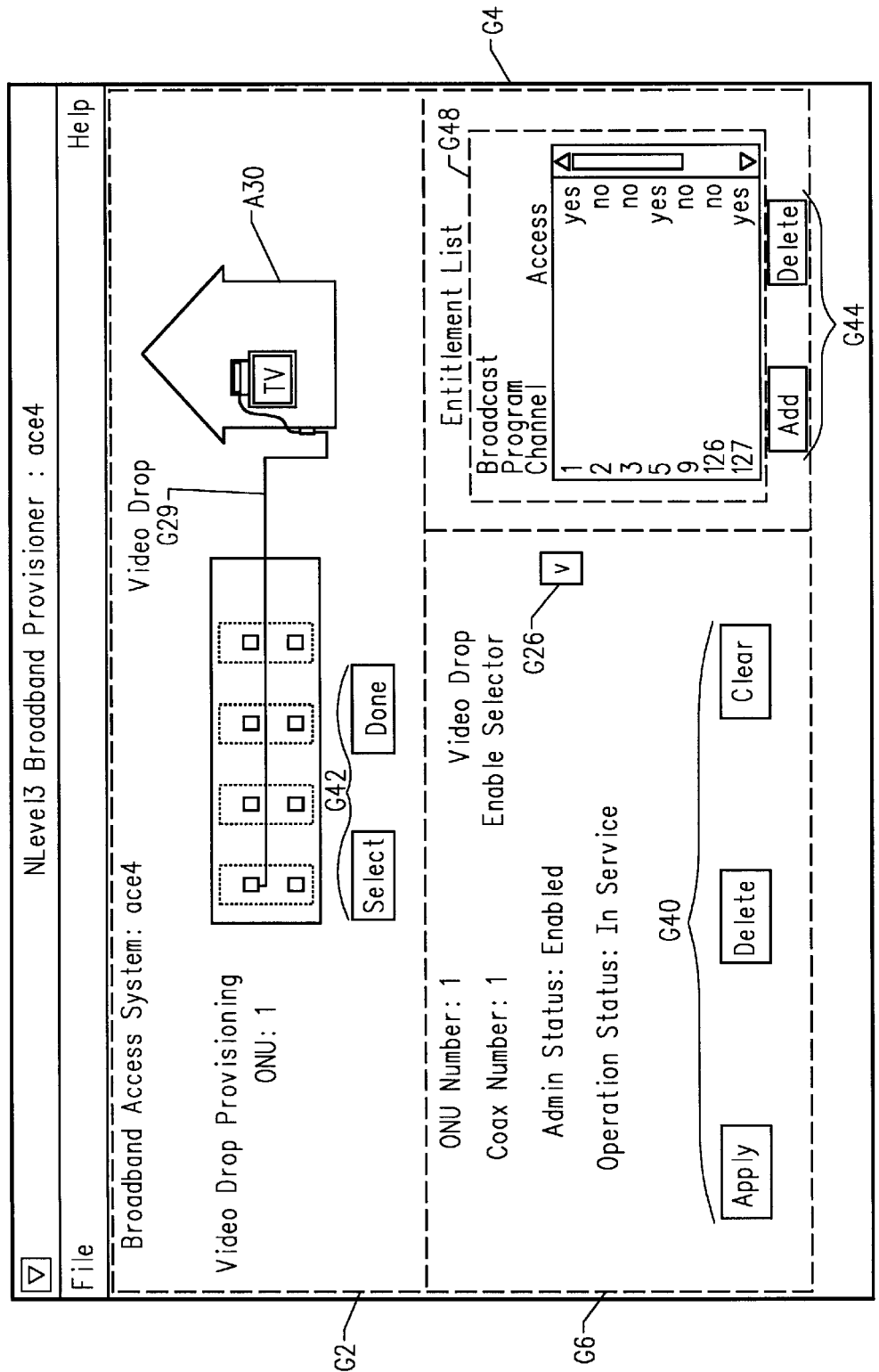
FIG. 15 illustrates the video drop provisioning function.

Video drop provisioning 829 allows a video service to be provisioned over a particular coaxial drop cable 128. FIG. 15 illustrates a screen which is presented to the operator for video drop provisioning, and consists of a video drop provisioning panel G2, a video drop status panel G6, and an entitlement list panel G48.

The video drop provisioning panel provides the operator with the ability to select a particular video drop, which is defined as a video service over a coaxial drop cable 128 from an ONU 110. The operator can use video drop selection options G42 to select a video drop. A video drop representation G29 is used to represent the connection between a coax device circuit pack and a subscriber site representation A30.

The video drop status panel G6 allows the operator to enable video services on a drop. This is accomplished via the use of a video drop ennoblement selector G26 and the video drop options G40.

The entitlement list panel G4 displays an entitlement list G48, and entitlement options G44 which allow the operator to allow or disallow access to specific programming on a particular video drop.

Figure 16:
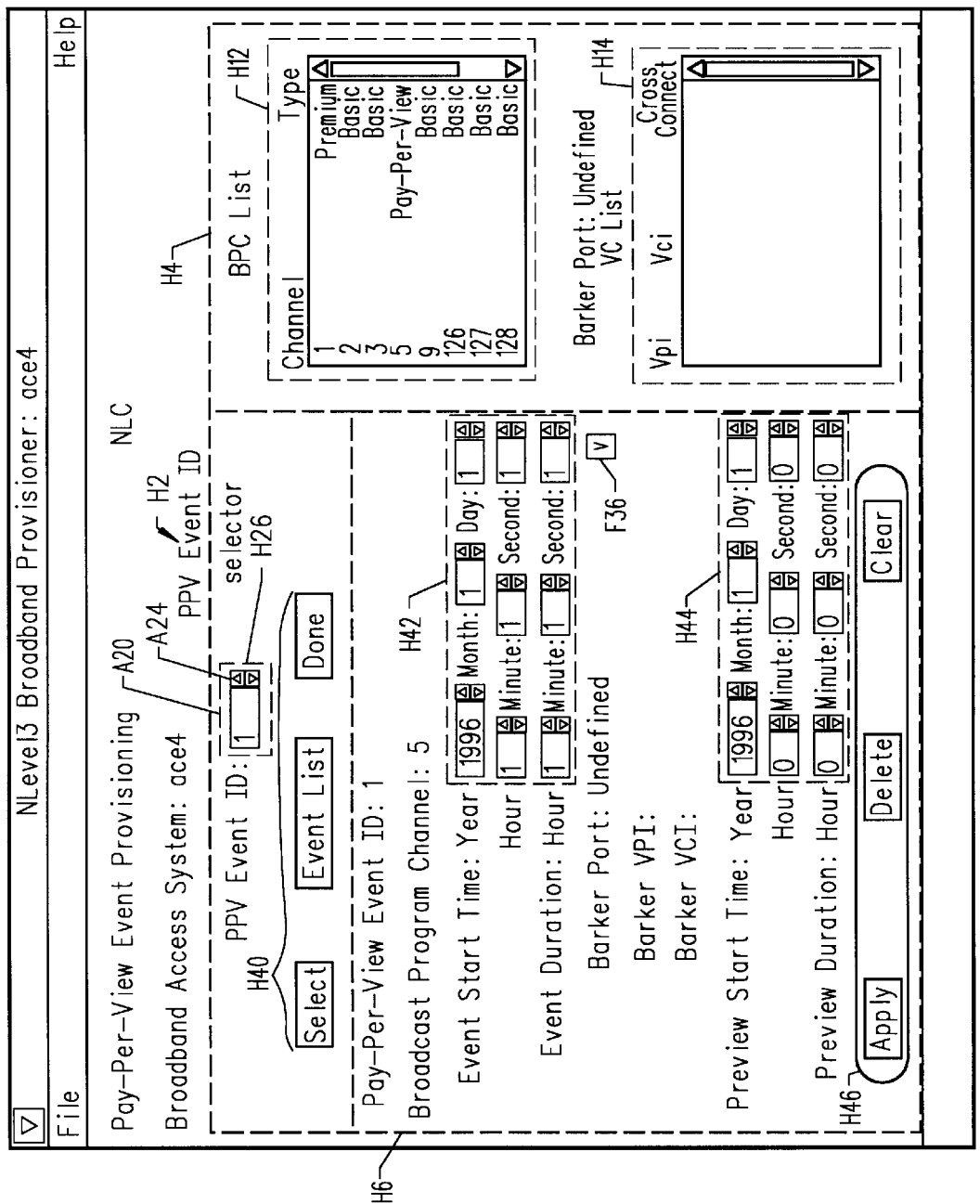
FIG. 16 illustrates the pay-per-view event provisioning function.

Pay-Per-View event provisioning can also be accomplished via the EMS 150, as illustrated in FIG. 16. FIG. 16 shows the screen presented to the operator for PPV event provisioning 827. The screen contains a PPV event panel H2, a PPV event parameters panel H6, and a PPV channel guide panel H4.

In the PPV event panel H2, the operator can choose a PPV event using a PPV event ID selector H26 which contains a numeric indicator A20 and a up/down control A24. PPV event options H40 allow the operator to select the appropriate event.

In the PPV event parameters panel H6, the operator is able to select the PPV event temporal parameters using the event timing controls H42. This includes the event start time and duration. The preview event timing controls H44 allow the operator to select the preview start time and duration. The PPV event options H46 allow the operator to apply or delete the specified event and preview parameters.

The PPV channel guide panel H4 provides a broadcast program channel list H12 which describes the programming subscribers will find on the channels, and a virtual channel list, which describes the virtual path indicators, virtual channel indicators, and cross-connect status for each of the channels.

Returning to the other subfunctions under the broadband provisioning 530, the ATM interface provisioning 802 is software for provisioning a physical port on the HDT 100. The ATM interface provisioning 802 allows for, on the network side, the support of three interfaces that the ATM cells pass over (e.g. two OC-12 one way (downstream only)

broadcast ports, one OC12 two-way interactive port). On the subscriber side, a large number of other types of devices (e.g., ODUs 115, ONUs 110, television setop box 178). Each of these devices is a logical VCI/VPI. This VCI/VPI provisioning is, as described above, done in the PVC provisioning 812. Thus, the PVC provisioning 812, and its subfunctions VPL provisioning 815, VCL provisioning 817 and PVC cross-connect provisioning 819, allows the operator to establish an ATM connection for delivering video or other data to a subscriber.

I. Browser for Use with EMS

In one embodiment of the invention, a new browser is included as part of EMS 150. The browser is a client program which executes on the computer system 101. The browser provides the operator with a graphical user interface and set of tools that are optimized for network management. In one embodiment, the tools include pull down menus for provisioning of equipment or services (both telephony and broadband services) in the FTTC system. The browser includes navigation tools for accessing network elements and servers which contain databases (e.g., object based broadband MIB 433 or OSS and BSS databases) required for provisioning equipment and services.

Because the browser is a client program, the browser does not need to be run at a central location but can be run from any location where there is access to a network (e.g. Internet network access) which provides connectivity to the required network elements and servers. Additionally, the operator can use any of a number of different types of computer systems 101 (e.g. a network computer, a handheld device, an engineering workstation, a set-top box, or a laptop) to run the browser. By accessing the server which contains the appropriate databases, the operator can access key network information, and with appropriate access, modify that information. Similarly, the operator can access network elements in the HDT 100 and ONUs 110 and diagnose problems and provision elements.

In one embodiment, the MIBs provide information to the browser via hypertext transport protocol (HTTP) as Hypertext Markup Language (HTML), Java, and/or Java Script. In one embodiment, the MIBs convert any requested information into HTML. The browser can construct a graphical representation of the status of the network elements from the HTML documents. In one embodiment, the network elements provide the browser with scripts that instruct the browser on how to graphically represent the network elements. For example, in one embodiment, an HDT provides the browser with a Java and/or Java Script program. The program instructs the browser on how to represent the status of the HDT. In one embodiment, the network element provides the browser with instructions to create a photorealistic image of the network element.

In another embodiment, the EMS 150 receives the information from the MIBs and then converts that information for HTTP transmission to a browser client. That is, the EMS 150 acts as a server for the browser client.

In one embodiment, the browser includes an alarm manager which automatically connects to a server containing any alarms from the network elements (e.g., as communicated by the event and alarm controller 455). In one embodiment, the alarms are reported using the "traps" in SNMP. In any case, the alarms allows the operator to have an up to date view of the status of the system.

The browser executes remotely, for example over Transmission Control Protocol/Internet Protocol (TCP/IP), from a central network management server, and/or directly on the server as the interface for network management (e.g., the interface for EMS 150). For example, the computer system 101 executing EMS 150 controls a number of HDTs 100 and ONUs 115. The browser, in this example, acts as the front end to the EMS 150 by providing the operator with access to the local data on the computer system 101 as well as the data on the HDTs 100 and the ONUs 115. Thus, the operator sees the same network management interface whether working at the physical location of the EMS 150 or from a remote location.

The following example illustrates a use of such a browser. An operator is charged with maintaining a number of HDTs 100 and ONUs 110. The operator works from a computer system 101 at a central location or from any other place to which the operator can connect the computer system 101 to the Internet. The computer system 101, executing the appropriate software, acts as the base for the EMS 150 for those HDTs 100 and ONUs 110. Through the browser, the operator accesses the EMS 150 information including the provisions equipment and service parameters.

The browser also allows the operator to access a particular HDT 100 or ONU 110 and directly read the MIBs in the equipment. In one embodiment, this functionality is provided by assigning each network element an Internet address and make the network management information in the MIBs accessible as HTML (e.g., using CGI). Similarly, information from other element connected to the HDTs 100, such as the PSTN switch 105 and the ATM network 103, network servers, and video servers, is also accessible. Using this browser, the operator can diagnose end-to-end problems in the system.

The security for the browser, in one embodiment, is helped by requiring password protection and by using SNMPv2 security or some other security system. In yet another embodiment, the operator accesses the elements via a separate network, not connected to the Internet. In another embodiment, the separate network includes an entry point from the Internet.

J. Conclusions

Thus, a FTTC system including an element management system has been described. The EMS 150 allows an operator to easily provision the many different types of elements in the FTTC system. The EMS 150 provides the operator with a graphical representation of the network. This graphical representation provides an intuitive interface for the operator. Interactions with the EMS 150 interface allows the operator to check the status of the elements in the FTTC system and to provision those elements to provide telephony and broadcast services.

The EMS 150 allows the operator to provision not only the HDT 100, but also the ONU 110, and the other network elements in the FTTC system. Thus, the EMS 150 provides flow-through provisioning of the FTTC system.

In one embodiment, the EMS 150 displays dynamic cross-connect information showing the creation and use of dynamic cross-connects to the operator. This feature helps the operator test and verify the functions of the dynamic cross-connection capabilities of the FTTC system.

In one embodiment, the operator interacts with the EMS 150 through a browser. The network elements provide information to the browser in HTML, Java or using other Internet information transfer techniques. This browser provides additional flexibility to the operator as the operator can provision network elements from any location with Internet access.

What is claimed is:

1. A method for managing a plurality of network elements in a Fiber-to-the-Curb (FTTC) telecommunications system, said FTTC system also including a computer system, said computer system being coupled in communications with said plurality of network elements, a method for managing said network elements comprising:

displaying a plurality of choices on said computer system, said plurality of choices corresponding to a provisioning equipment function, a provisioning telephony services functions and a provisioning broadband services function;

receiving a selection identifying a choice and identifying one or more selected network elements; and provisioning said one or more selected network elements.

2. The method of claim 1 wherein said displaying a plurality of choices on said computer system includes:

displaying a graphical representation of at least a first network element of said plurality of network elements; and displaying modifiable information relating to said first network element, said selection corresponding to a modification of said modifiable information.

3. The method of claim 2 wherein said graphical representation includes a photorealistic representation of said first network element.

4. The method of claim 2 wherein said graphical representation includes a graphical representation of a first network element and a second network element and a graphical representation of a physical medium connecting said first network element and said second network element.

5. The method of claim 1 wherein receiving said selection includes receiving a first signal corresponding to a network element and receiving a second signal corresponding to a provisioning function to be performed on said network element.

6. The method of claim 5 wherein said first signal includes a mouse input selection signal.

7. The method of claim 1 wherein said plurality of choices further includes a Host Digital Terminal (HDT) provisioning function, an Optical Network Unit (ONU) provisioning function, and an interface device provisioning function.

8. The method of claim 1 wherein said plurality of choices further includes a network side line provisioning function, a subscriber side line provisioning function, a cross-connect provisioning function, and an interface group provisioning function.

9. The method of claim 1 wherein said plurality of choices further includes Asynchronous Transfer Mode (ATM) interface provisioning function, a Permanent Virtual Circuits (PVCs) provisioning function, and a video broadcast provisioning function.

10. The method of claim 1 wherein said provisioning said one or more selected elements includes:

preparing a message for said network element, said message including instructions to provision said network element according to said selection;

transmitting said message to said network element; and said network element modifying corresponding network element state information to effect a change of operation of said network element.

11. The method of claim 10 wherein said preparing a message includes preparing an SNMP agent request to said network element and wherein said network element modifying includes said network element converting said SNMP agent request to a set of interprocess communications calls to be performed within said network element, said set of interprocess communications calls effecting said change of operation of said network element.

12. A method of displaying information about a plurality of network elements in a Fiberto-the-Curb (FTTC) system, said FTTC system being coupled in communications with a computer, said method comprising:

displaying a graphical representation of a Host Digital Terminal (HDT) with at least one HDT circuit pack and a graphical representation of an Optical Network Unit (ONU) with an ONU designator;

receiving a selection of a selected ONU using said ONU designator;

displaying a graphical representation of a connection between said HDT circuit pack and said selected ONU;

receiving a selection of said selected ONU for equipment provisioning;

displaying a graphical representation of at least one ONU circuit pack; and displaying a graphical representation of a connection between said ONU circuit pack and a drop cable.

13. The method of claim 12 wherein prior to said displaying said graphical representation of said HDT, said computer system communicating with said FTTC system to determine an identity and status of said HDT, said identity indicating an existence of said at least one HDT circuit pack.

14. The method of claim 12 wherein said ONU designator is a numeric identifier of said selected ONU.

15. A method of provisioning a network element in a network, said network including a computer system, a host data terminal (HDT) and an optical network unit (ONU), said computer system being coupled in communications with said HDT and said ONU, said computer system having a processor coupled to a memory, said method comprising the steps of:

transmitting an SNMP agent message to said HDT;

said HDT responding to said SNMP agent message with state information of said network element;

displaying a graphical representation of said network element including a representation of said state information;

receiving a request to modify said state information;

transmitting a second SNMP agent message to said HDT to modify said state information; and said HDT causing a change of said state information to effect said provisioning of said network element.

16. A method for provisioning of telephony services in a Fiber-to-the-Curb (FTTC) telecommunications system having a plurality of network elements and including at least one Central Processing Unit (CPU), said CPU coupled to a display for displaying data, and a user input means, said CPU further coupled to said network elements, said FTTC system including a plurality of ONU circuit packs and a plurality of ONU drop cables, said method comprising:

displaying a graphical representation of said plurality of ONU circuit packs and said plurality of ONU drop cables;

displaying telephony services provisioning choices and means of selection for said provisioning of telephony services;

receiving a selection of one of said choices;

displaying further telephony services provisioning choices for analog telephony services and Integrated Service Digital Network (ISDN) services and a means of selection for said further telephony services provisioning choices;

receiving a selection of one of said further telephony services provisioning choices; and provisioning said at least some of said plurality of network elements in said FTTC telecommunications system corresponding to said one of said further telephony provisioning choices telephony services.

17. A method for displaying dynamic cross-connects in a Fiber-to-the-Curb (FTTC) system having a plurality of network elements, said FTTC system being coupled in communications with a computer system, said method comprising:

displaying a graphical representation of a cross-connect including a DS1 identifier, a DS0 identifier, and an analog line identifier;

obtaining current cross-connect information from at least a first network element of said plurality of network elements; and displaying a graphical representation of a connection based upon said cross-connect information in said graphical representation of a cross-connect.

18. The method of claim 17 wherein said obtaining current cross-connect information from said first network element is initiated by selecting a refresh option displayed on said computer system.

19. The method of claim 18 wherein said obtaining of current cross-connect provisioning information from said first network element occurs automatically when said cross-connect information changes.

20. A method of provisioning broadband services in a Fiber-to-the-Curb (FTTC) system having a plurality of network elements, said FTTC system coupled to a computer system, said method comprising:

displaying a broadcast program channel identifier;

displaying a first interface element for selecting a broadcast program channel;

displaying broadcast program parameters;

displaying a second interface element for selecting said broadcast program parameters;

displaying a third interface element for applying said broadcast program parameters;

displaying a broadband program virtual channel configuration;

displaying a fourth interface element for selecting said broadband program virtual channel configuration;

selecting said broadcast program channel;

selecting said broadcast program parameters;

applying said broadcast program parameters to at least one of said network elements in said FTTC system;

selecting a virtual channel configuration;

applying said virtual channel configuration to at least one of said network elements in said FTTC system.

21. A method of provisioning a network element in a network, said network element being coupled in communications with a server and a computer system, said method including:

transmitting a state information request to said server including a request for state information for said network element;

generating a hypertext markup language (HTML) representation of said state information;

displaying said HTML representation on said computer system;

receiving input requesting a change to said state information;

transmitting a change of state request to said server; and said server provisioning said network element by changing said state information of said network element.

22. The method of claim 21 wherein said transmitting said state information request includes transmitting an SNMP agent request to said server.

23. The method of claim 21 wherein said generating said HTML representation includes accessing a management information base within a host data terminal in said network.

24. A method of providing network element information about a network element in a Fiber-to-the-Curb (FTTC) network, said network including a computer system, said network element including a database, said method comprising:

accessing said network element information from said database;

converting said network element information for transmission as hypertext information;

transmitting said hypertext information to said computer system; and displaying a graphical representation of said hypertext information on said computer system.

25. The method of claim 24 wherein said accessing said network element information includes connecting said computer system to said FTTC network, transmitting an SNMP agent message requesting said network element information from said network element, accessing a management information base within said network element, preparing a response to said SNMP agent message, and transmitting said response to said computer system.

26. The method of claim 24 wherein said converting said network element information for transmission includes generating a Hypertext Markup Language (HTML) representation of said network element information.

27. The method of claim 24 wherein said network element information includes state information indicating a state of a parameter used in provisioning said network element.

28. The method of claim 24 wherein said transmitting said hypertext information to said computer system includes preparing said hypertext information for transmission over Hypertext Transport Protocol.

29. The method of claim 24 wherein said displaying said graphical representation includes displaying a graphical representation of said network element and displaying a graphical representation of a state of a parameter used to provision said network element.

* * * * *

UNITED STATES PATENT AND TRADEMARK OFFICE
CERTIFICATE OF CORRECTION

PATENT NO. : 5,935,209
DATED : August 10, 1999
INVENTOR(S) : Budhraja, et al.

It is certified that error appears in the above-identified patent and that said Letters Patent is hereby corrected as shown below:

Column 9, line 19 change "baser" to --base--
Column 14, line 22 Delete "In another embodiment, the operator"
Column 14, line 56 change "VPL" and "VCL" to --VPI--and --VCI--
Column 15, line 32 change "ennoblement" to --enablement--
Column 16, line 7 change "VPL" and "VCL" to --VPI-- and --VCI--

Signed and Sealed this

Twenty-second Day of February, 2000

Attest:

Q. TODD DICKINSON

*Attesting Officer*      *Commissioner of Patents and Trademarks*